United States Patent
Willming et al.

(10) Patent No.: US 7,114,070 B1
(45) Date of Patent: Sep. 26, 2006

(54) SYSTEM AND METHOD FOR AUTOMATIC DIGITAL CERTIFICATE INSTALLATION ON A NETWORK DEVICE IN A DATA-OVER-CABLE SYSTEM

(75) Inventors: David Willming, Palatine, IL (US); Paul Chan, Carol Stream, IL (US); William Necka, Bloomingdale, IL (US); Ronald Lee, San Diego, CA (US)

(73) Assignee: 3Com Corporation, Marlborough, MA (US)

( * ) Notice: Subject to any disclaimer, the term of this patent is extended or adjusted under 35 U.S.C. 154(b) by 865 days.

(21) Appl. No.: 10/075,926

(22) Filed: Feb. 14, 2002

Related U.S. Application Data

(63) Continuation-in-part of application No. 09/772,095, filed on Jan. 26, 2001.

(51) Int. Cl.
| | |
|---|---|
| *H04L 9/00* | (2006.01) |
| *H04K 1/00* | (2006.01) |
| *H04L 9/30* | (2006.01) |
| *H01S 3/10* | (2006.01) |
| *H01S 3/13* | (2006.01) |
| *H01S 3/00* | (2006.01) |
| *H01S 3/30* | (2006.01) |

(52) U.S. Cl. .................... 713/156; 713/168; 713/171; 713/175; 713/176; 380/30; 726/28; 726/29; 726/30; 726/5; 726/6

(58) Field of Classification Search ........ 713/168–171, 713/175–176, 155–158; 380/30; 726/5–6, 726/28–30

See application file for complete search history.

(56) References Cited

U.S. PATENT DOCUMENTS

| | | | |
|---|---|---|---|
| 4,644,533 A | 2/1987 | Braff et al. .................. 370/94 |
| 4,881,263 A | 11/1989 | Herbison et al. ............. 380/21 |
| 4,996,685 A | 2/1991 | Farese et al. ............... 370/58.1 |
| 5,014,234 A | 5/1991 | Edwards, Jr. ............... 364/900 |
| 5,138,712 A | 8/1992 | Corbin ....................... 395/700 |
| 5,301,273 A | 4/1994 | Konishi ...................... 395/200 |
| 5,347,304 A | 9/1994 | Moura et al. ................. 348/12 |
| 5,430,727 A | 7/1995 | Callon ..................... 370/85.13 |
| 5,442,749 A | 8/1995 | Northcutt et al. ....... 395/200.09 |
| 5,488,412 A | 1/1996 | Majeti et al. ................. 348/10 |
| 5,489,897 A | 2/1996 | Inoue .................... 340/870.39 |
| 5,528,595 A | 6/1996 | Walsh et al. ............. 370/85.13 |
| 5,583,931 A | 12/1996 | Schneider et al. .......... 379/399 |
| 5,586,121 A | 12/1996 | Moura et al. ............... 370/404 |
| 5,598,410 A | 1/1997 | Stone ......................... 370/469 |
| 5,600,717 A | 2/1997 | Schneider et al. .......... 379/399 |

(Continued)

OTHER PUBLICATIONS

Droms, R., *Dynamic Host Configuration Protocol*, Request for Comments 1541, Oct. 1993, pp. 1 to 31.

(Continued)

*Primary Examiner*—Ayaz Sheikh
*Assistant Examiner*—Longbit Chai
(74) *Attorney, Agent, or Firm*—McDonnell Boehnen Hulbert & Berghoff

(57) ABSTRACT

A system and methods for automatic digital certificate installation on network devices in a data-over-cable network are developed. One of the methods includes sending a digital certificate request from a cable modem to a predetermined network server upon determining on the cable modem that there is no digital certificate already installed on the cable modem. The method further includes generating at least one digital certificate on the network server and providing the at least one digital certificate to the cable modem.

25 Claims, 11 Drawing Sheets

U.S. PATENT DOCUMENTS

| | | | |
|---|---|---|---|
| 5,606,606 A | 2/1997 | Schneider et al. | 379/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,949,877 A * | 9/1999 | Traw et al. | 713/171 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Andersen et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A * | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,442,158 B1 | 8/2002 | Beser | 370/352 |
| 6,510,162 B1 | 1/2003 | Fijolek et al. | 370/432 |
| 6,671,804 B1 * | 12/2003 | Kent | 713/175 |
| 6,715,075 B1 * | 3/2004 | Loukianov | 713/176 |
| 6,772,331 B1 | 8/2004 | Hind et al. | |
| 6,789,193 B1 * | 9/2004 | Heiden | 713/175 |
| 6,823,454 B1 * | 11/2004 | Hind et al. | 713/168 |
| 6,886,095 B1 | 4/2005 | Hind et al. | |
| 6,980,660 B1 | 12/2005 | Hind et al. | |

OTHER PUBLICATIONS

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-37.

"Radio Frequency Interface Specification (Interim Specification) SP-RF1v1.1-103-991105", MCNS Holdings, L.P., 1999, pp. Ii to 366.

"Cable Modem to Customer Premise Equipment Interface Specification (Interim) SP-CMCI-102-980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specification (Interim Specification) SP-RSMI-I01-980204", MCNS Holding, L.P., Cable Television Laboratories, Inc., 1997, pp. ii to 47.

"Baseline Privacy Interface Specification (Interim) SP-BPI-I01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Security System Specification (Interim Specification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1.txt>," Mar. 1998, pp. 1 to 26.

Kyees, P.J. et al., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services*, Acoustics, Speech, and Signal Processing, 1995, ICASSP-95., 1995 International Conference, vol. 4, ISBN: 0-7803-2431-5, May 9-12, 1995, pp. 2655-2658.

"A Solution for the Priority Queue Problem of Deadline-Ordered Service Disciplines," N.R. Figueira, IEEE International Conference on Computer Communications and Networks, Sep. 22-25, 1997, pp. 320-325.

"Radio Frequency Interface Specification (Interim Specification) SP-RFI-I04-980724", MCNS Holdings, L.P., 1997, pp. ii to 196.

"Radio Frequency Interface Specification (Interim Specification) SP-RFI-I05-991105", MCNS Holdings, L.P., 1999, pp. Ii to 202.

"Radio Frequency Interface Specification (Interim Specification) SP-RFIv1.1-I06-001215", MCNS Holdings, L.P., 2000, pp. ii to 432.

* cited by examiner

FIGURE 4B
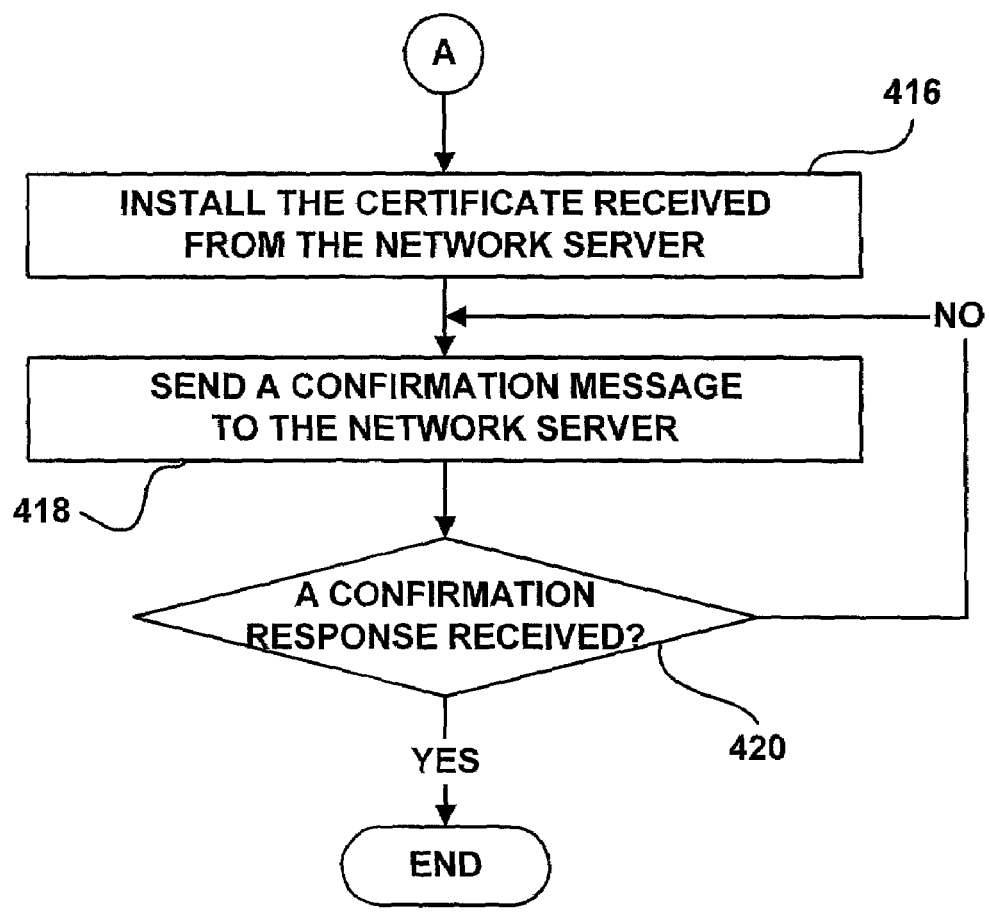
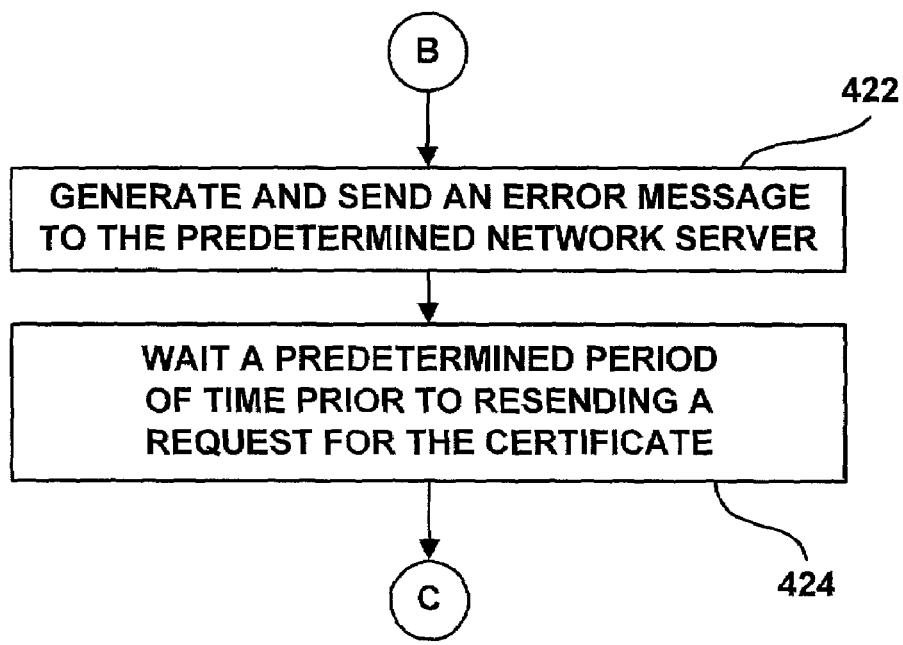

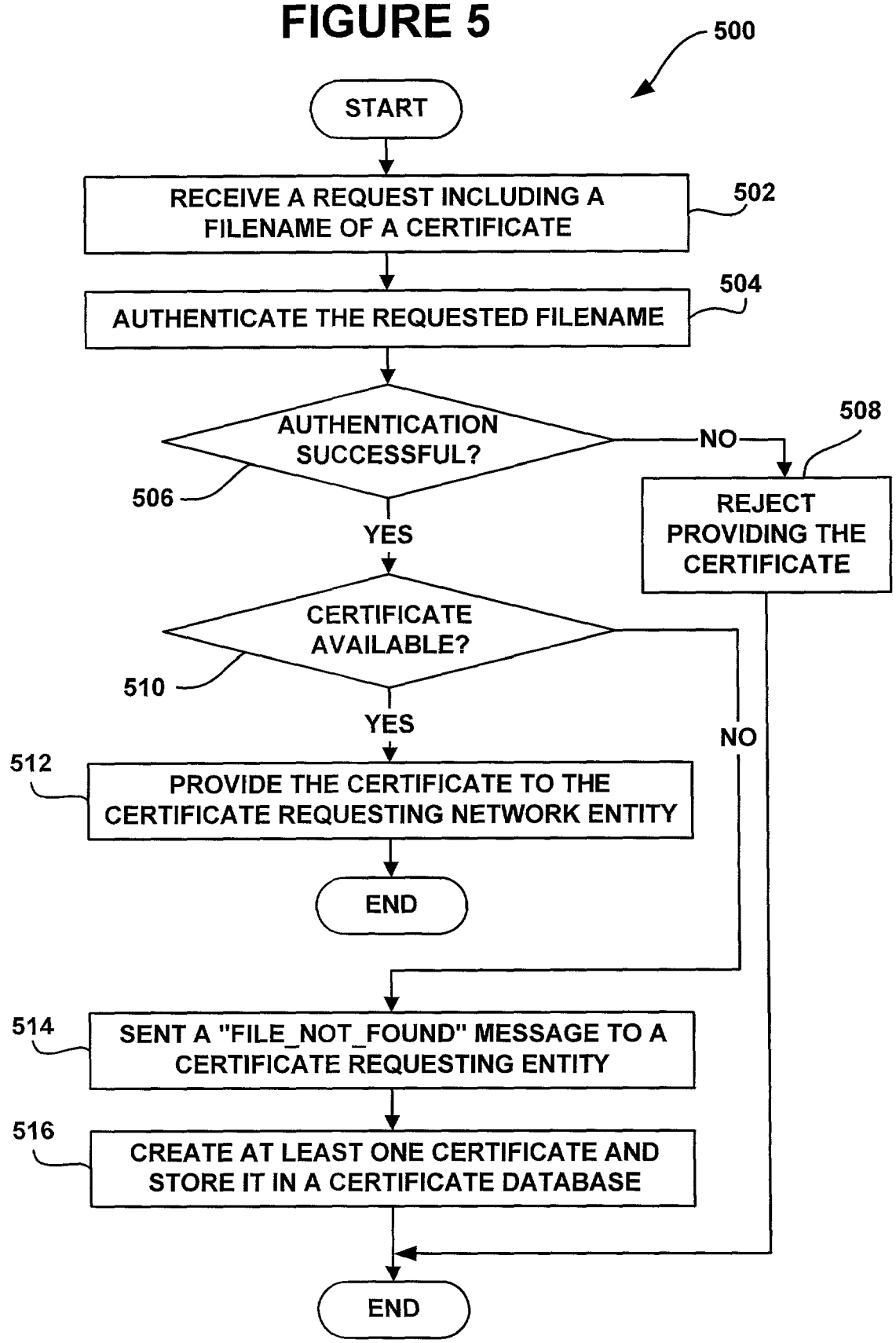

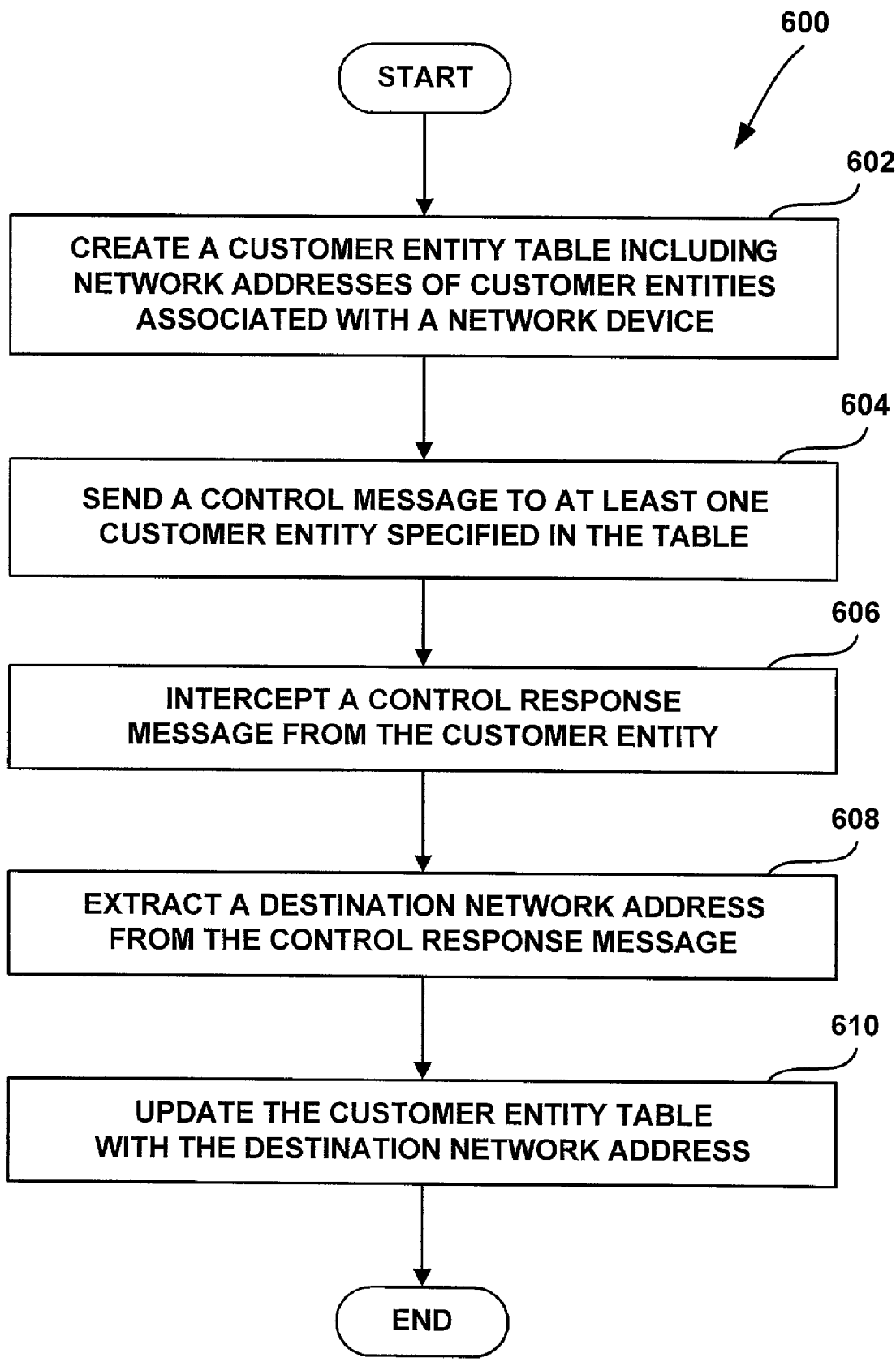

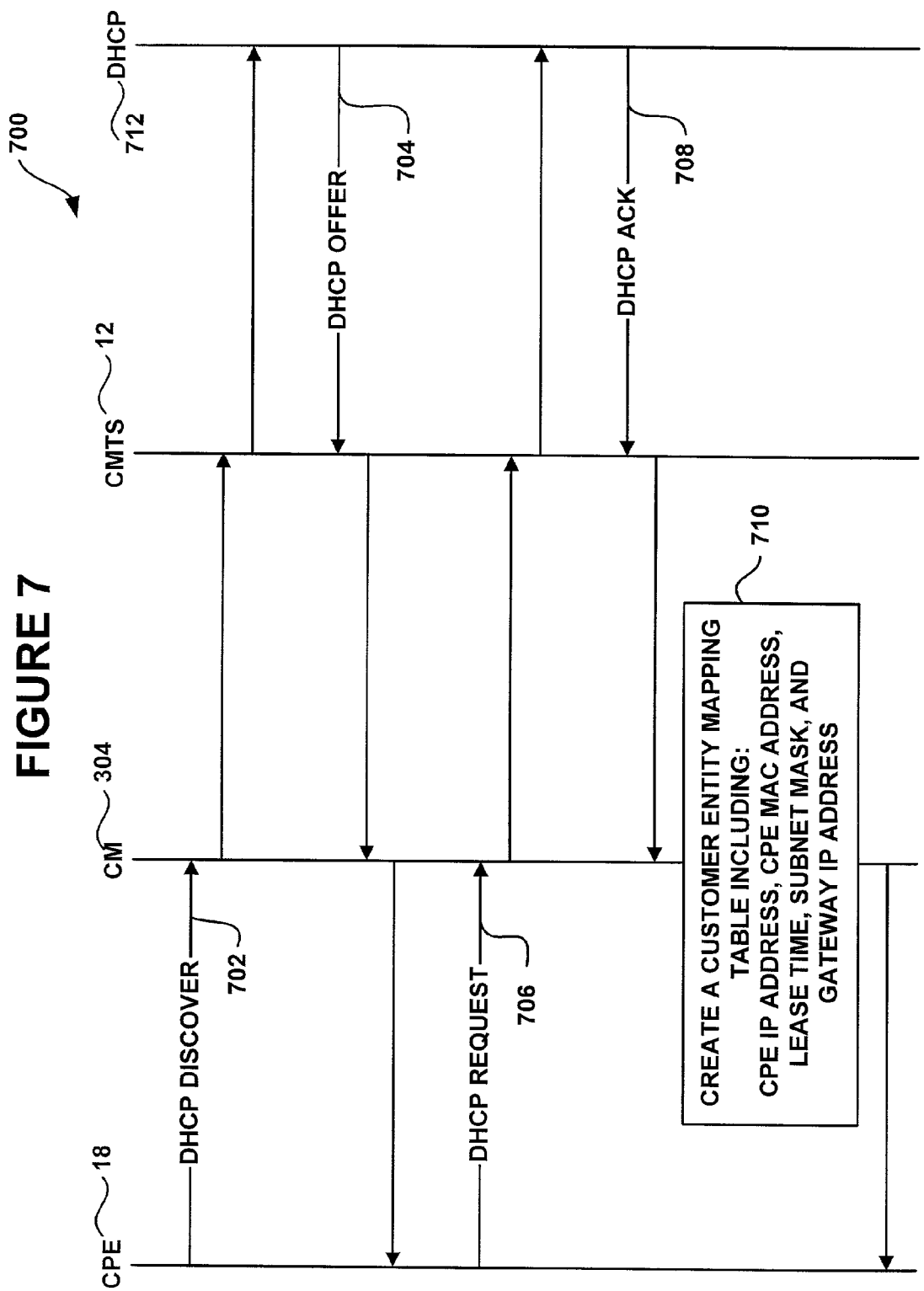

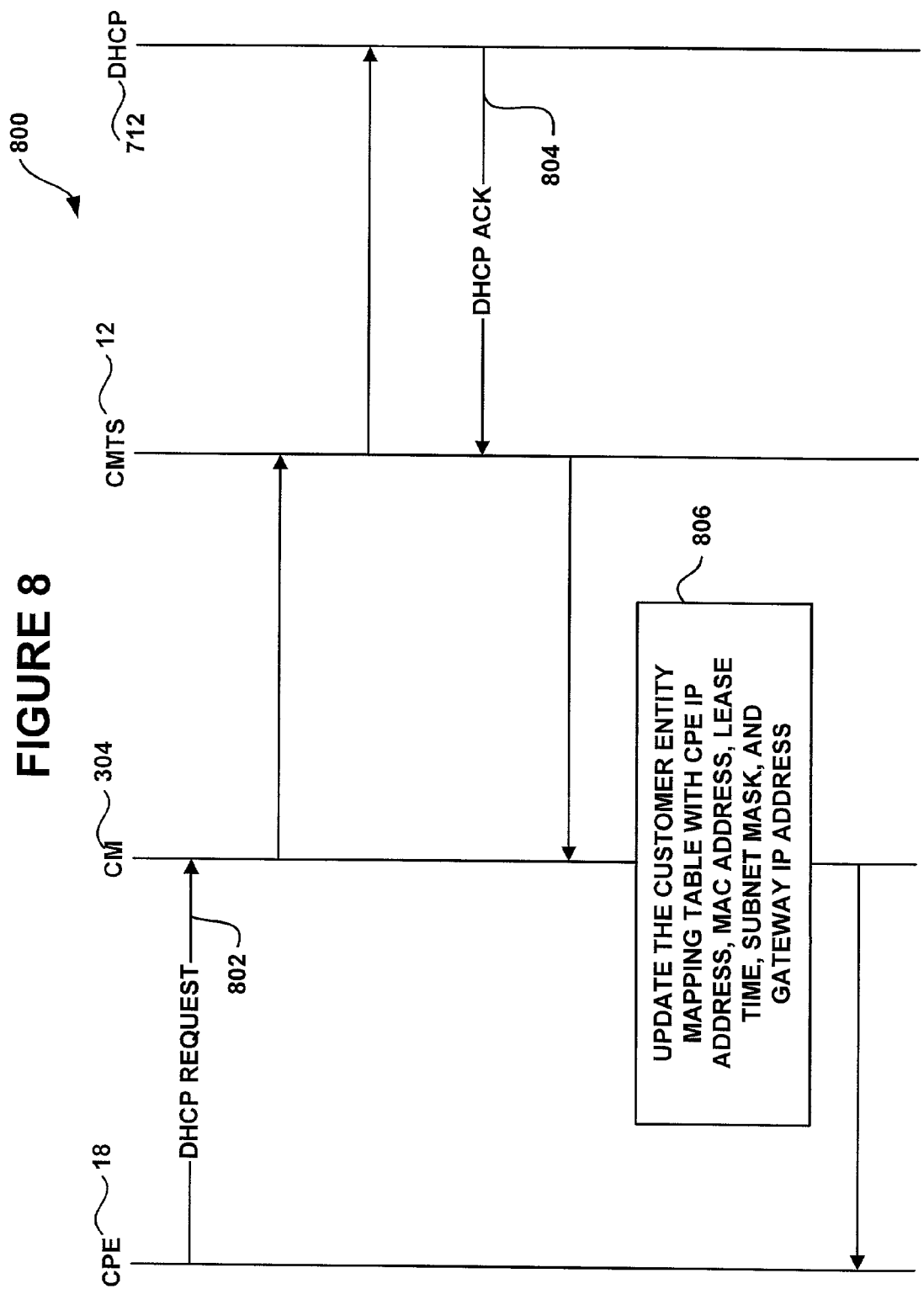

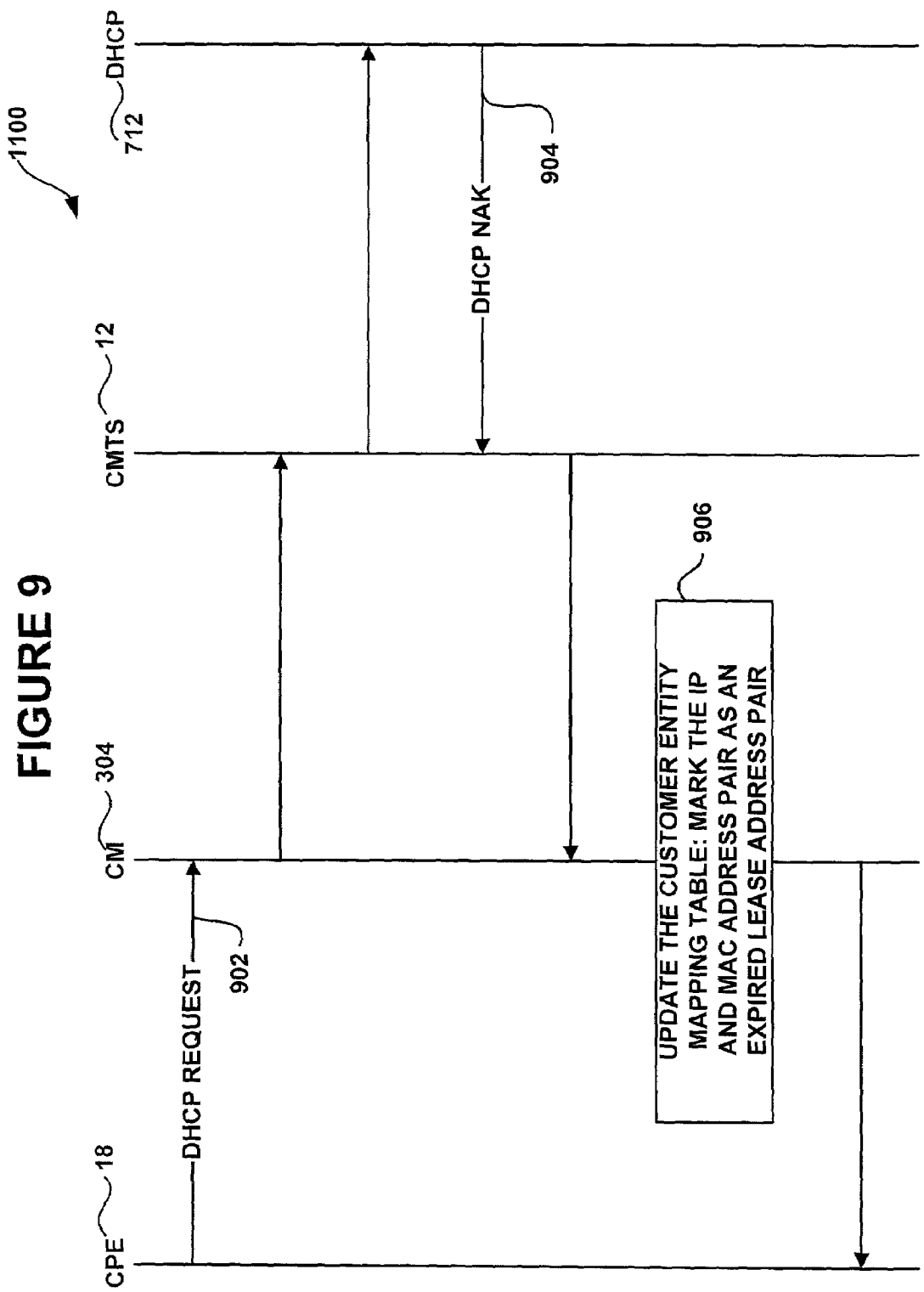

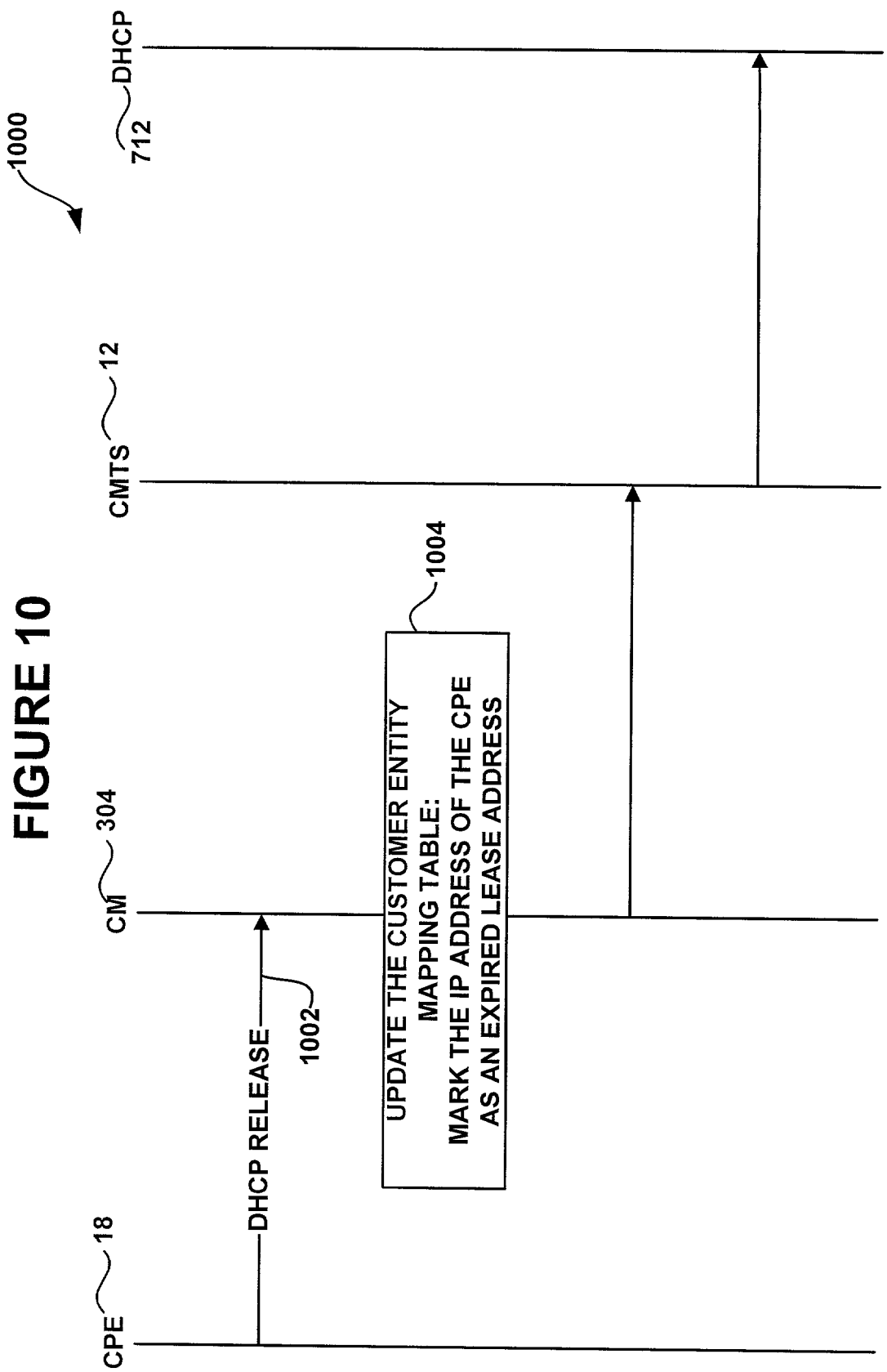

SYSTEM AND METHOD FOR AUTOMATIC DIGITAL CERTIFICATE INSTALLATION ON A NETWORK DEVICE IN A DATA-OVER-CABLE SYSTEM

CROSS REFERENCE TO RELATED APPLICATION

This application is a continuation-in-part of U.S. patent application Ser. No. 09/772,095, entitled "A System and Method for a Specialized Dynamic Host Configuration Protocol Proxy in a Data-Over-Cable Network," filed Jan. 26, 2001, the contents of which are incorporated herein by reference.

FIELD OF THE INVENTION

The present invention relates to communications in computer networks. More particularly, it relates to automatic digital certificate installation mechanism in a data-over-cable system.

BACKGROUND OF THE INVENTION

Cable television networks such as those provided by Comcast Cable Communications, Inc., of Philadelphia, Pa., Cox Communications of Atlanta Ga., Time-Warner Cable, of Marietta Ga., Continental Cablevision, Inc., of Boston Mass., and others, provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps, to 30+ Mbps available on a coaxial cable or HFC cable system on a cable television network. Further, the ISPs allow customers to connect to the Internet via other types of connections, such as a Digital Subscriber Line ("DSL") connection providing data transmission rates from 512 kbps to 1.544 Mbps downstream and about 128 kbps upstream, or an Asymmetric Digital Subscriber Line ("ADSL") connection providing data transmission rates up to 6.1 Mbps downstream and 640 kbps upstream.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga., and others, offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps, which is a much larger data rate than can be supported by a modem used over a serial telephone line.

Many cable television networks provide bi-directional cable systems, in which data is sent "downstream", from a "headend" to a customer, as well as "upstream", from the customer back to the headend. The cable system headend is a central location in the cable television network and, further, is responsible for sending cable signals in the downstream direction and receiving cable signals in the upstream direction. An exemplary data-over-cable system with RF return typically includes customer premises equipment entities such as a customer computer, a cable modem, a cable modem termination system, a cable television network, and a data network such as the Internet.

Some cable television networks provide only uni-directional cable systems, supporting only a "downstream" data path, which provides a path for flow of data from a cable system headend to a customer. A return data path via a telephone network, such as a public switched telephone network provided by AT&T and others, (i.e., a "telephone return") may be used for an "upstream" data path, which provides a path for flow of data from the customer back to the cable system headend. A cable television system with an upstream connection to a telephone network is typically called a "data-over-cable system with telephony return."

An exemplary data-over-cable system with a telephony return typically includes customer premises equipment ("CPE") entities (such as a customer computer or a Voice over Internet Protocol ("VoIP") device), a cable modem, a cable modem termination system, a cable television network, a public switched telephone network, a telephone remote access concentrator, and a data network (e.g., the Internet). The cable modem termination system and the telephone remote access concentrator combined are called a telephone return termination system.

In a bi-directional cable system, when the cable modem termination system receives data packets from the data network, the cable modem termination system transmits received data packets downstream via the cable television network to a cable modem attached to a customer premises equipment entity. The customer premises equipment entity sends response data packets to the cable modem, which sends the response data packets upstream via the cable network. The cable modem termination system sends the response data packets back to the appropriate host on the data network.

In the case of a telephony return system, when a cable modem termination system receives data packets from a data network, the cable modem termination system transmits the received data packets downstream via a cable television network to a cable modem attached to a customer premises equipment entity. The customer premises equipment entity sends response data packets to the cable modem, which sends response data packets upstream via a public switched telephone network to a telephone remote access concentrator. Next, the telephone remote access concentrator sends the response data packets back to the appropriate host on the data network.

When a cable modem used in a cable system is initialized, the cable modem establishes a communication link to a cable modem termination system via a cable network and, in telephony return data-over-cable systems to a telephone return termination system via a public switched telephone network. As the cable modem is initialized, the cable modem initializes one or more downstream channels via the cable network. Also upon initialization, the cable modem receives a configuration file (a boot file) from a configuration server via a trivial file-transfer protocol ("TFTP") exchange process.

As the theft of service is becoming a vital concern for cable network operators, a few standards have been developed to provide cable operators with basic protection from the theft of service. These standards, among others, include a Data-Over-Cable-Service-Interface-Specification ("DOCSIS") Baseline Privacy Interface ("BPI") Specification and a Data-Over-Cable-Service-Interface-Specification ("DOCSIS") Baseline Privacy Plus Interface ("BPI+") Specification. The Baseline Privacy Interface Specification is currently utilized in data-over-cable networks, while the Baseline Privacy Plus Interface Specification products are currently being developed and tested.

The Baseline Privacy Interface Specification provides cable modem users with data privacy across a network by encrypting data flow between cable modems and headend entities such as a cable modem termination system. The secondary goal of the Baseline Privacy is to provide cable operators with a basic protection from the theft of service. Since the data privacy is the primary service goal of that specification, and given that neither a cable modem nor a cable modem termination system authentication is a prerequisite for providing the data privacy, the Baseline Privacy's key distribution protocol does not authenticate cable modems and cable modem termination systems, i.e., it does not employ authentication mechanisms such as passwords or digital signatures. In the absence of authentication, the Baseline Privacy provides a basic service protection by ensuring that a cable modem, uniquely identified by its 48-bit physical (Medium Access Control "MAC") address, can only obtain keying material for services it is authorized to use.

The Baseline Privacy Plus Interface ("BPI+") specification describes Medium Access Control layer security services for cable modems and cable modem termination systems that interact based on standards proposed by the Data-Over-Cable-Service-Interface Specification ("DOCSIS"). Specifically, the Baseline Privacy Plus provides cable modem users with the data privacy across the cable networks and prevents unauthorized users from gaining access to the network services. The Baseline Privacy Plus specification proposes a key management protocol providing a service protection by adding a digital-certificate-based cable modem authentication.

According to the basic operation of the Baseline Privacy Plus, a cable modem has an internally installed digital certificate issued by a cable modem manufacturer. A digital certificate is an electronic version of an identification card that establishes credentials and authenticates communication between two network entities. One of the widely used standards for defining digital certificates includes a X.509 digital certificate standard. For more information on the X.509 security certificates, see the Request For Comments ("RFC") 2459, "Internet X.509 Public Key Infrastructure Certificate and CRL Profile," by R. Housley, W. Ford, W. Polk, and D. Solo, incorporated herein by reference. The digital certificate issued by the manufacturer includes a cable modem's public key and a physical (MAC) address. The digital certificate may further include a manufacturer's signature that binds the MAC address of the cable modem with its keying data such as its public key. When the cable modem receives the digital certificate, the cable modem may use the signature specified in the certificate to authenticate the received digital certificate. Certificates received on cable modems may also include different identifying information such as a manufacturer's identifier. When a cable modem requests authorization from a cable modem termination system, the cable modem presents its digital certificate that is then verified on the cable modem termination system. Upon a successful verification of the digital certificate, the cable modem termination system typically uses the public key specified in the certificate to encrypt an authorization key, which is then sent to the cable modem requesting authorization.

According to the Baseline Privacy Plus specification, a cable modem termination system associates a cable modem's authenticated identity to a paying subscriber and to data services that the subscriber is authorized to access. Therefore, with the authorization key exchange, the cable modem termination system establishes an authenticated identity of a client cable modem and network services that the cable modem is authorized to access. Further, since the cable modem termination system authorizes cable modems, system resources are protected from attacks of hacker cable modems masquerading the identity of legitimate cable modems. Further, the use of digital certificates prevents unauthorized cable modems from passing fake credentials to the cable modem termination system.

The assumption of the Baseline Privacy Plus specification is that cable modems would be manufactured with installed digital certificates. However, such an assumption creates a problem for cable modems already deployed in data-over-cable systems, as for those cable modems to run in the Baseline Privacy Plus mode, they need to obtain digital certificates. A number of methods for providing digital certificates to cable modems are described in the existing Data-Over-Cable-Service-Interface-Specification standards. One of such methods employs management protocols to download a digital certificate to a cable modem. Using the proposed methods, a cable operator may use one of the existing network management protocols to retrieve a physical (MAC) address and a public key from a cable modem, and, subsequently, send the retrieved data to a cable modem's manufacturer. Upon a receipt of the cable modem's data, the manufacturer may create a digital certificate for the cable modem and send it to the cable modem operator. Then, the cable modem operator may employ the network management protocols to load the certificate on the cable modem.

The existing method for providing digital certificates has several drawbacks. First, it requires a cable operator to retrieve authentication and configuration information from cable modems and then format the retrieved data according to the manufacturers' standards. Further, it requires a lot of coordination between cable operators and manufacturers, and, lastly, it does not guarantee that all of cable modems intended for an upgrade will actually get upgraded since some of the cable modems may be offline or in the inventory when the process is run by a cable operator.

Therefore, it is still desirable to develop a system and method for providing digital certificates to network entities such as cable modems in a data-over-cable system.

SUMMARY OF THE INVENTION

One aspect of the invention includes methods and system for dynamic digital certificate installation on a cable modem. In one embodiment, when a cable modem determines that there is no digital certificate installed in its memory unit, the cable modem requests a digital certificate from a predetermined network server, such as a predetermined Trivial File Transfer Protocol ("TFTP") server. When the network server receives the request, the network server generates at least one digital certificate and provides it to the cable modem. Upon receipt of the digital certificate, the cable modem installs it in its memory unit.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIGS. 4A and 4B are flow chart for installing a digital certificate on a network entity in a data-over-cable system;

FIG. 5 is a flow chart illustrating a method for generating and providing a digital certificate by a network server;

FIG. 6 is a flow chart illustrating a method for obtaining a globally routable IP address on a network entity;

FIG. 7 is a block diagram illustrating a message flow where a network entity monitors DHCP traffic flow during a DHCP acquisition process;

FIG. 8 is a block diagram illustrating a message flow where a network entity monitors DHCP traffic flow during a DHCP address renewal process;

FIG. 9 is a block diagram illustrating a message flow where a network entity monitors DHCP traffic flow during a DHCP address renewal decline process; and FIG. 10 is a block diagram illustrating a message flow where a network entity monitors DHCP traffic flow during a DHCP address release process.

DETAILED DESCRIPTION OF AN EXEMPLARY EMBODIMENT

Exemplary Data-Over-Cable System

Figure 1:
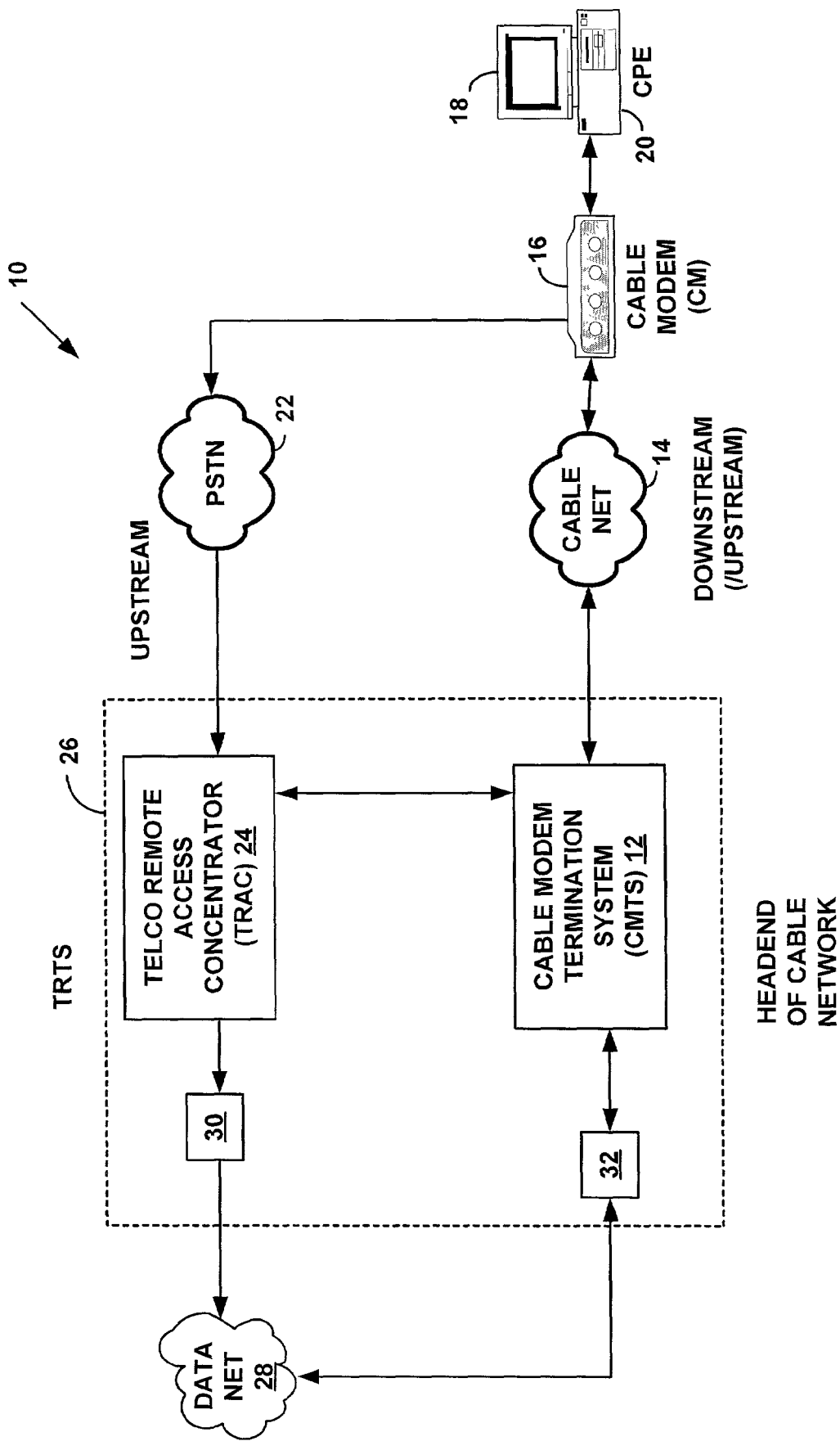
FIG. 1 is a block diagram illustrating a cable modem system.

FIG. 1 is a block diagram illustrating an exemplary data-over-cable system 10. The data-over-cable system 10 may be a bi-directional cable system supporting a downstream data flow and an upstream data flow to and from a cable television network "headend" from and to a customer premises equipment entity, including but not limited to a personal computer, personal digital assistant, or a set-top box, for instance. The cable television network "headend" is a central location responsible for sending cable signals in a downstream direction and an upstream direction. In a bi-directional cable system, customer premises equipment entities or a cable modem may have an upstream connection to a cable modem termination system via a cable television connection, a wireless connection, a satellite connection or a different connection by which the cable modem may send data upstream to the cable modem termination system.

Alternatively, the data-over-cable system 10 may be a uni-directional cable system supporting only a downstream data path from a cable television network headend to a customer premises equipment entity, such as a personal computer. In the uni-directional cable system, a return path is typically established via a telephone network ("telephone return" or "telco return"), which provides an "upstream" data path from the customer premises equipment back to the cable television network "headend". In a uni-directional cable system, a cable modem may comprise an integral or non-integral telephone modem for connecting to a Public Switched Telephone Network ("PSTN") such as a PSTN 22, and the integral telephone modem may be connected to the cable modem for exchanging data.

The data-over-cable system 10 includes a Cable Modem Termination System ("CMTS") 12 connected to a cable television network 14, hereinafter, a cable network 14. FIG. 1 illustrates one CMTS 12. However, the data-over-cable system 10 may include multiple CMTS 12. Further, according to an exemplary embodiment, the CMTS 12 and any other network entities that will be described in the following paragraphs may be duplicated in a serial or a parallel arrangement to provide a back-up system in case of a primary network device's failure.

In an exemplary embodiment of the present invention, the CMTS 12 may be a Total Control hub by 3Com Corporation of Santa Clara, Calif., with a cable modem termination unit. A Total Control hub is a chassis with multiple networking cards connected by a common bus. However, the CMTS 12 could also be another network server such as a CMTS by Cisco Systems of San Jose, Calif., or others. It should be understood that different cable modem termination units could also be used.

The cable network 14 may be a cable television network such as one provided by Comcast Cable Communications, Inc., of Philadelphia, Pa., Cox Communications of Atlanta, Ga., or Time-Warner Cable, of Marietta, Ga., or other.

A cable modem ("CM") 16 is connected to the cable network 14 with a downstream cable connection. The cable modem may be provided by 3Com Corporation of Santa Clara, Calif., Scientific Atlanta of Norcross, Ga., or Motorola Corporation of Arlington Heights, Ill., or others. It should be understood that in the two-way cable system, system 100 does not include PSTN 22, TRAC 24 or interface 30, and CM 16 may directly access data network 28 via cable network 14, CMTS 12 and 32.

Network devices for exemplary embodiments of the present invention include network devices that can interact based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org." However, the present invention is not limited to these standards, and any other presently existing or later developed standards could also be used.

Further, the data-over-cable system 10 may be Packet Cable specifications compliant. The Packet Cable standards may be found on the World Wide Web at the URL "www.packetcable.com." The Packet Cable specifications define mechanisms required for supporting voice and video transmission over cable systems. If the data-over-cable system 10 is Packet Cable specification compliant, the CM 16 may comprise an internal media terminal adapter, or a media terminal adapter may otherwise be provided in communications with the CM 16. The media terminal adapter may provide network interface functionality for transmitting voice or video signals and for converting analog voice inputs or video signals to IP packets using, for instance, the Real Time Transport protocol.

Furthermore, if the data-over-cable system 10 is Packet Cable Specification compliant, the data-over-cable system 10 may include additional network devices such as a call management server and a gate controller, for instance. The call management server may enable the media terminal adapter to establish multimedia sessions including voice communications applications such as "IP telephony" or "VoIP". The gate controller may be used to perform authorization and authentication checks for users attempting to connect to the CMTS 12.

FIG. 1 illustrates one CM 16 connected to the CMTS 12. However, typical data-over-cable systems include tens or hundreds of thousands of CMs 16 connected to the CMTS 12. In addition, as shown in FIG. 1, the CM 16 is connected to a CPE entity 18 such as a personal computer system, a VoIP device or a telephone, for instance. The CM 16 may be connected to the CPE entity 18 via a Cable Modem-to-CPE Interface ("CMCI") 20. FIG. 1 illustrates one CPE entity 18. However the CM 16 is typically coupled to multiple CPE entities.

If the data-over-cable system 10 is a bi-directional data-over-cable system, the CM 16 may have an upstream and downstream connection to the CMTS 12 via a cable television connection, a wireless connection or a satellite connection, for instance. FIG. 1 illustrates an exemplary upstream and downstream connection to the CMTS 12 via the cable network 14. In such an embodiment, the CMTS 12 may still provide data from the PSTN 22 to the CM 16 or the CPE entity 18.

In a downstream direction of a bi-directional data-over-cable system, a cable system typically has a passband with a lower edge between 50 MHz and 54 MHz and an upper edge between 300 MHz to 864 MHz. However, the data-over-cable system 10 is not limited to such frequencies, and frequencies in data-over-cable system may be implementation dependent. In the upstream direction, the cable system may have an operating frequency passband range from 5 MHz to 30 MHz or 5 MHz to 40 MHz, for instance.

As mentioned above, the cable system 10 may be a unidirectional cable system. In a unidirectional cable system, the CM 16 is connected to the PSTN 22 or other such network, which provides an upstream telephone connection. The upstream telephone connection may be a standard telephone line connection such as an Integrated Services Digital Network ("ISDN") connection, an Asymmetric Digital Subscriber Line ("ADSL") connection or a wireless connection, for instance.

In that arrangement, the PSTN 22 may be connected to a Telephone Remote Access Concentrator ("TRAC") 24. In the data-over-cable system having an upstream telephone connection, the TRAC 24 may be a Total Control telephone hub by 3Com Corporation of Santa Clara, for instance. However, the TRAC 24 could also be a telephone hub manufactured by a different company, or could take still other forms. It should be understood that TRAC 24 may be implemented as a second hub in addition to CMTS 12, but different embodiment, such as CMTS and TRAC being implemented on the same entity, is possible as well.

The combination of the CMTS 12 and the TRAC 24 is called a "Telephone Return Termination System" ("TRTS") 26. The data-over-cable system 10 may also include a plurality of network interfaces. As shown in FIG. 1, the TRAC 24 is connected to a data network 28 (e.g. the Internet, an intranet, a LAN or a WAN, for instance) via a TRAC-Network System Interface 30 ("TRAC-NSI"). The CMTS 12 is connected to the data network 28 via a CMTS-Network System Interface ("CMTS-NSI") 32.

Further, the data-over-cable system 10 may comprise a policy/authorization server in communication with the CMTS 12. The authorization/policy server may manage overall policies with an administrative domain such as an Internet service provider, for instance. The CMTS 12 may also comprise an internal authorization module that may serve as a policy enforcement point, for instance.

The system 10 may also comprise a bandwidth manager in communication with the CMTS 12. The bandwidth manager may detect network trends, measure network response times, generate CoS and QoS reports, allocate bandwidth and/or keep records of allocated and available bandwidth.

However, it should be understood that the present invention is not limited to the use within the data-over-cable system illustrated in FIG. 1. More, fewer, different or equivalent components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

Further, as mentioned above, network entities in the data-over-cable system 10 may be duplicated to provide a back-up in case of failure of one or more network entities. For instance, the network entities may be duplicated in parallel or in series. In a parallel arrangement, for instance, the CMTS 12 comprising an internal authorization/policy server and an internal bandwidth manager may be duplicated. The CMTS 12 and a duplicated CMTS 12' (not shown) may operate simultaneously, with one of them active and the other one in a "standby" state. In such an arrangement, the two units may communicate using a "keep alive" signal, for instance. Thus, if the primary CMTS 12 fails, the redundant CMTS 12' may immediately start operating, and, ideally, there is no loss of service.

In another exemplary embodiment providing a back-up system, redundant units may operate in a serial manner. In the serial arrangement, units may be cross-connected with a heart-beat controlled shunt on ports. Further, in the serial arrangement, both units may be active, as opposed to a primary device being in an active state and a redundant device being in a standby state, as in the parallel arrangement. In another exemplary embodiment of the present invention, any individual integral components or groups of components may be duplicated.

An operating environment for each CMTS 12, CM 16, CPE 18, TRAC 24 and other network entities of an exemplary embodiment may include a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions could be referred to as being "computer-executed", "processing unit executed", or the like.

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations may be physical locations that could have particular electrical, magnetic, optical, or organic properties for maintaining data bits.

The data bits may also be maintained on a computer readable medium such as magnetic disks, optical disks, organic disks, and any other volatile or non-volatile mass storage system readable by the processing unit, for instance. The computer readable medium may include cooperating or interconnected computer readable media, which may exist exclusively on the processing system or may be distributed among multiple interconnected processing systems that may be local or remote to the processing system.

Network Device Protocol Stack

Figure 2:
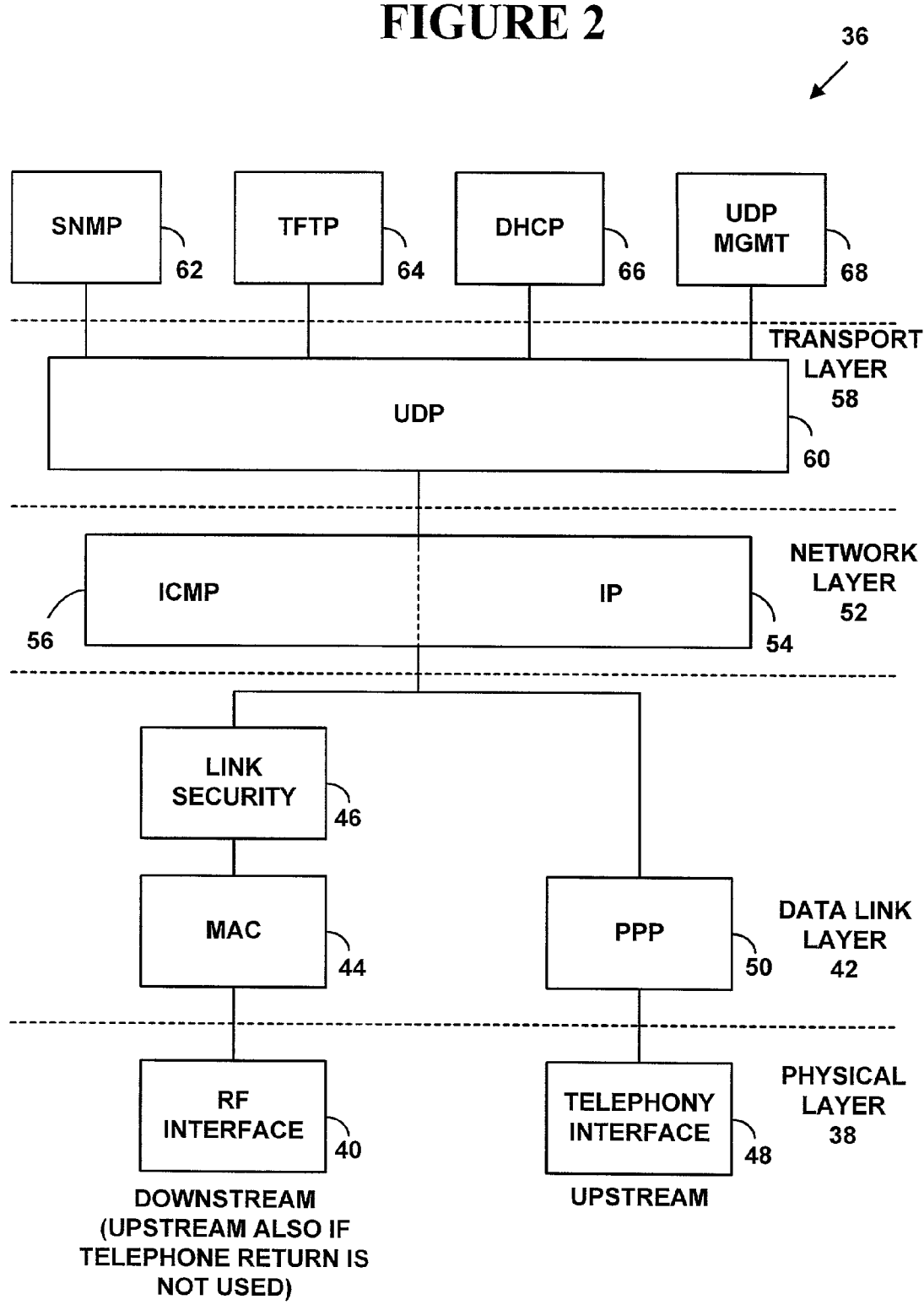
FIG. 2 is a block diagram illustrating a protocol stack for a data-over-cable system.

FIG. 2 is a block diagram illustrating an exemplary protocol stack 36 for network devices in the data-over-cable system 10. In an exemplary embodiment of the present invention, network entities in the data-over-cable system 10 may be DOCSIS compliant. However, other standards may also be used, and the present invention is not limited to the DOCSIS compliant network entities.

FIG. 2 illustrates downstream and upstream protocols used in the CM 16, for instance. As known in the art, the Open System Interconnection ("OSI") model may be used to describe computer networks. The OSI model consists of seven layers including, from lowest to highest, a physical layer, a data-link layer, a network layer, a transport layer, a session layer, a presentation layer and an application layer. The physical layer transmits bits over a communication link. The data-link layer transmits error free frames of data. The network layer transmits and routes data packets.

In bi-directional data-over cable systems, the CM 16 is connected to the cable network 14 in a physical layer 38 via a Radio Frequency ("RF") Interface 40. In an exemplary embodiment of the present invention, for a downstream data transmission, the RF Interface 40 may have an operation frequency range of 50 Mega-Hertz ("MHz") to 1 Giga-Hertz ("GHz") and a channel bandwidth of about 6 to 8 MHz. However, other operation frequencies may also be used, and the invention is not limited to these frequencies. For an upstream transmission the RF Interface 40 may have an operation frequency range of about 5 MHz to 50 MHz. Further, the RF Interface 40 may use a signal modulation method, such as Quadrature Amplitude Modulation ("QAM"). As known in the art, the QAM is used as means for encoding digital information over radio, wire, or fiber optic transmission links. The QAM is a combination of amplitude and phase modulation and is an extension of a multiphase phase-shift-keying. The QAM may have any number of discrete digital levels typically including 4, 16, 64 or 256 levels. In an exemplary embodiment, QAM-64 may be used in the RF Interface 40. However, other operating frequencies and modulation methods could also be used, such as a Quadrature Phase Shift Keying ("QPSK") modulation, for instance. Further, the RF Interface 40 can also be used in a telephony return data-over-cable system.

In a data-over-cable system with a telephony return employed for an upstream connection, the CM 16 may be connected to the PSTN 22 in the physical layer via a telephone interface 48. In an exemplary embodiment, the telephony interface may operate in accordance with one of the standards of the International Telecommunications Union-Telecommunication ("ITU-T") Standardization Sector. The telephone interface 48 may use the ITU-T V.90 standard, for instance. As known in the art, the ITU-T V.90 standard is commonly used in a data link layer of modem communications, and it currently allows data rates as high as 55,600 bits-per-second ("bps"). However, the telephone interface 48 may also operate according to other communications standards, such as V.32 standard, V.34 standard or V.xx standard, where .xx defines any later versions of the standard. Further, the telephone interface 48 could also be an Asymmetric Subscriber Link ("ADSL") interface, an Integrated Services Digital Network ("ISDN") interface or a wireless interface, for instance.

Above the RF Interface 40, there is a data link layer comprising a Medium Access Control ("MAC") layer 44. As known in the art, the MAC layer 44 controls access to a transmission medium via the physical layer 38. The MAC layer 44 may use a protocol described in IEEE 802.14, incorporated herein by reference. However, other MAC layer protocols could also be used, such as MCNS MAC layer protocol, for instance. Above the MAC layer 44 may be a link security protocol stack 46. The link security protocol stack 46 prevents unauthorized users from making a data connection from cable network 14.

A Point-to-Point Protocol ("PPP") layer 50 is in the data link layer 42 and above the telephony interface 48. As known in the art, the PPP layer encapsulates network layer datagrams over a serial communication link. More information on the PPP protocol may be found on the World Wide Web at the URL "www.ietf.org" in a Request for Comments ("RFC"), RFC-1661, incorporated herein by reference.

A network layer 52 is above both the downstream protocol layer and the upstream protocol layer. The network layer 52 comprises an Internet Protocol ("IP") layer 54 and an Internet Control Message Protocol ("ICMP") layer 56. The IP layer 54 corresponds to the OSI layer 3, which is the network layer, but, typically, is not defined as part of the OSI model. As known in the art, the IP is a routing protocol designed to route traffic within a network or between networks. More information on the IP protocol may be in RFC-791, incorporated herein by reference. The ICMP layer 56 is used for network management. The ICMP provides a plurality of functions, such as an error reporting, reachability testing (e.g., "pinging"), congestion control, route-change notification and performance or subnet addressing, for instance. More information on the ICMP may be found in RFC-792, incorporated herein by reference.

A transport layer 58 is above the network layer 52. The transport layer 58 comprises a User Datagram Protocol ("UDP") layer 60, which approximately corresponds to the OSI layer 4, the transport layer. As known in the art, the UDP provides a connectionless mode of communication with datagrams. More information on the UDP layer 60 may be found in RFC-768, incorporated herein by reference. However, the transmission layer 58 is not limited to the User Datagram Protocol, and other protocols, such as a Transmission Control Protocol ("TCP"), could also be used. More information on the TCP may be found in RFC-793, incorporated herein by reference.

Above the transport layer 58, there are a Simple Network Management Protocol ("SNMP") layer 62, a Trivial File Transfer Protocol ("TFTP") layer, a Dynamic Host Configuration Protocol ("DHCP") layer 66 and a UDP manager 68. The SNMP layer 62 is used to support network management functions. More information on the SNMP layer may be found in RFC-1157, incorporated herein by reference. The TFTP layer 64 is a file transfer protocol, which is typically used to download files and configuration information. More information on the TFTP layer 64 may be found in RFC-1350, incorporated herein by reference. The DHCP layer 66 is a protocol for passing configuration information to hosts on the IP network 54. More information on the DHCP layer 66 may be found in RFC-1541, RFC-2131 and RFC-2132, incorporated herein by reference. The UDP manager 68 distinguishes and routes packets to an appropriate service. However, more, fewer, or different protocol layers could be used in the data-over-cable system 10.

According to an exemplary embodiment of the present invention, the CM 16 may support transmission and reception of IP datagrams as specified by RFC-791, incorporated herein by reference. The CM 16 may be also configured to filter IP datagrams with IP addresses assigned to the CM 16 or CPE 18. Further, the CMTS 12 and the TRAC 24 may also perform filtering of IP datagrams.

During the initialization of the CM 16, the CMTS 12 transmits to the CM 16 a Termination System Information ("TSI") message, which is a MAC management message. The CMTS 12 may use the TSI message to report to the CM 16 whether or not a bi-directional system is used, for instance. Further, the TSI message may be used to provide the CM 16 with information about the status of the CMTS 12.

Additionally, during the initialization process, the CM 16 may initiate a Dynamic Host Configuration Protocol ("DHCP") process. The DHCP process is used to provide configuration parameters to hosts on a network such as an IP network, for instance. The DHCP process provides two main services to network clients such as CMs or CPE entities. First, during the DHCP process, IP network addresses are allocated to clients and, second, configuration parameters are provided to network entities.

During a typical use of the DHCP process, the CM 16 and CPE 18 broadcast a "DHCPDISCOVER" message to receive configuration settings such as an IP address for the CM 16 and an IP address for the CPE 18. During the DHCP process, DHCP servers may respond with DHCPOFFER messages including configuration parameters. Then, the CM 16 or the CPE 18 may select one of the DHCP offers and may send a DHCPREQUEST message to the selected server. Upon a receipt of the DHCPREQUEST message on the selected server, the server may generate a DHCPOFFER message including a configuration file name for the CM 16 and an IP address assigned to the CM 16. Once the CM 16 receives the configuration file name from the selected server, the CM 16 may initiate a TFTP exchange process to request a configuration file from a TFTP server associated with the TFTP file name.

Automatic Digital Certificate Installation

Figure 3:
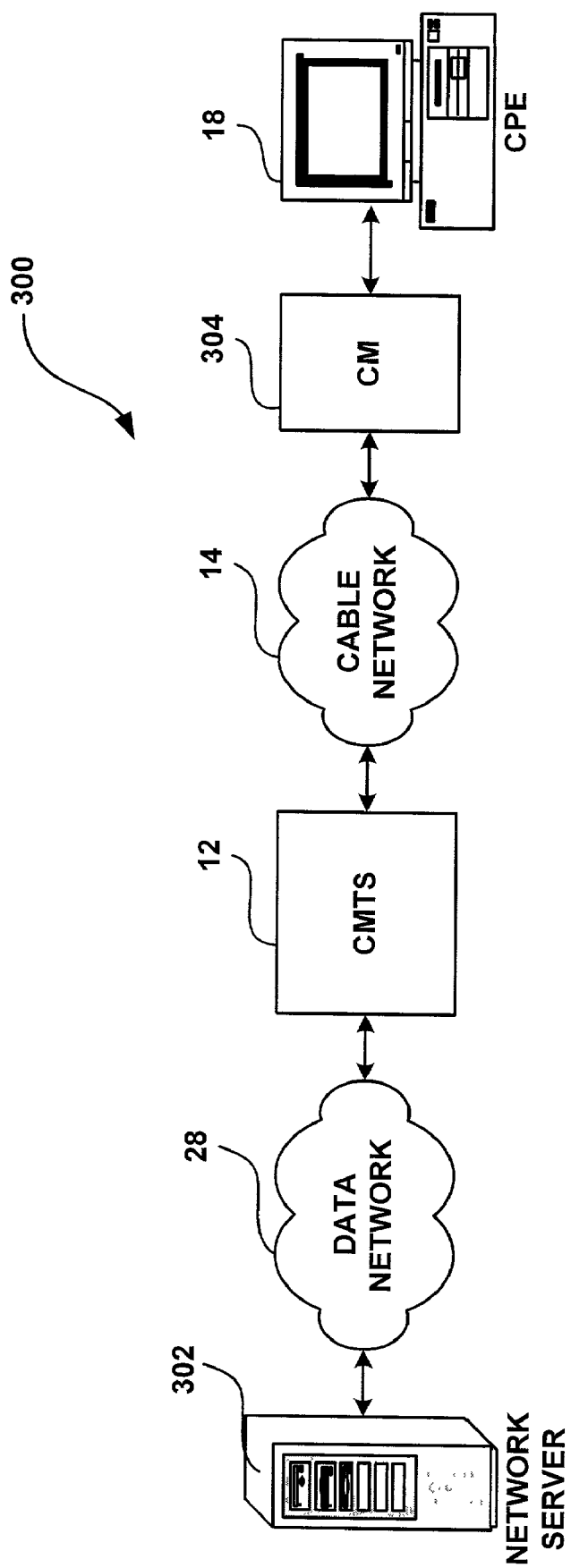
FIG. 3 is a block diagram illustrating an exemplary system architecture for automatic dynamic certificate installation.

FIG. 3 is a block diagram illustrating an exemplary data-over-cable system 300 including a plurality of network entities that may be employed in an automatic digital certificate installation. The exemplary system 300 includes the CPE 18, a CM 304, the bi-directional cable network 14, the CMTS 12, the data network 28, and a network server 302.

According to an exemplary embodiment, the server 302 is configured to generate and supply digital certificates to cable modems, such as the CM 304, upon receiving digital certificate requests from the cable modems. In one embodiment, the server 302 may include a TFTP server having a predetermined IP address, for instance. However, it should be understood that different types of servers could also be used, and the present invention is not limited to the TFTP servers. The server 302 may include an internal database for storing digital certificates generated for the cable modems. Alternatively, the server 302 may communicate with an external database.

In one embodiment, the CM 304 may be configured with a network address of the server 302 and, further, with a set of instructions for performing a digital certificate installation process upon booting and determining that there is no certificate already installed in its memory unit. When the CM 304 requests a certificate file from the server 302, the server 302 retrieves a set of instructions arranged to dynamically create a digital certificate, the method of which will be described in greater detail in reference to subsequent figures. Alternatively, a certificate file including at least one certificate may be created prior to receiving a certificate request from the CM 304, and the server 302 may be pre-loaded with the certificate files. In such an embodiment, the server 302 may first authenticate the request and then determine whether a filename specified in a certificate request matches one of the certificate filenames pre-stored in its database. If the match is found and the requesting network entity is successfully authenticated, the server 302 returns a pre-stored file including at least one certificate, such as a device certificate, to the requesting network entity. If the requesting device includes a CM, the device certificate is a CM device certificate. In additional to the device certificate, the file returned by the server 302 may also include a manufacturer certificate or a private key.

The digital certificates created on the server 304 may include X.509 digital certificates, for instance. However, it should be understood that different types of certificates could also be used, and the present invention is not limited to the X.509 digital certificates. Typically, a digital certificate binds a network device's encryption key to other identifying information of the network device such as a manufacturer's identifier, a serial number or a network address, such as a MAC address, of the network device associated with the certificate. A public key, i.e., an encryption key, is publicly available unlike a private, i.e., a decryption key that is exclusively known to a network device associated with the key pair including private and public keys. A private key is typically used on a network device to create a digital signature that may be attached to encrypted data transmitted from the network device to a remote device. When the remote device receives the encrypted data with the digital signature, the remote device verifies the digital signature using the sending device's public key.

It should be understood that exemplary embodiments for dynamic certificate installation are not limited to the network entities illustrated in FIG. 3, and more, fewer, or equivalent network entities could also be used.

Figure 4A:
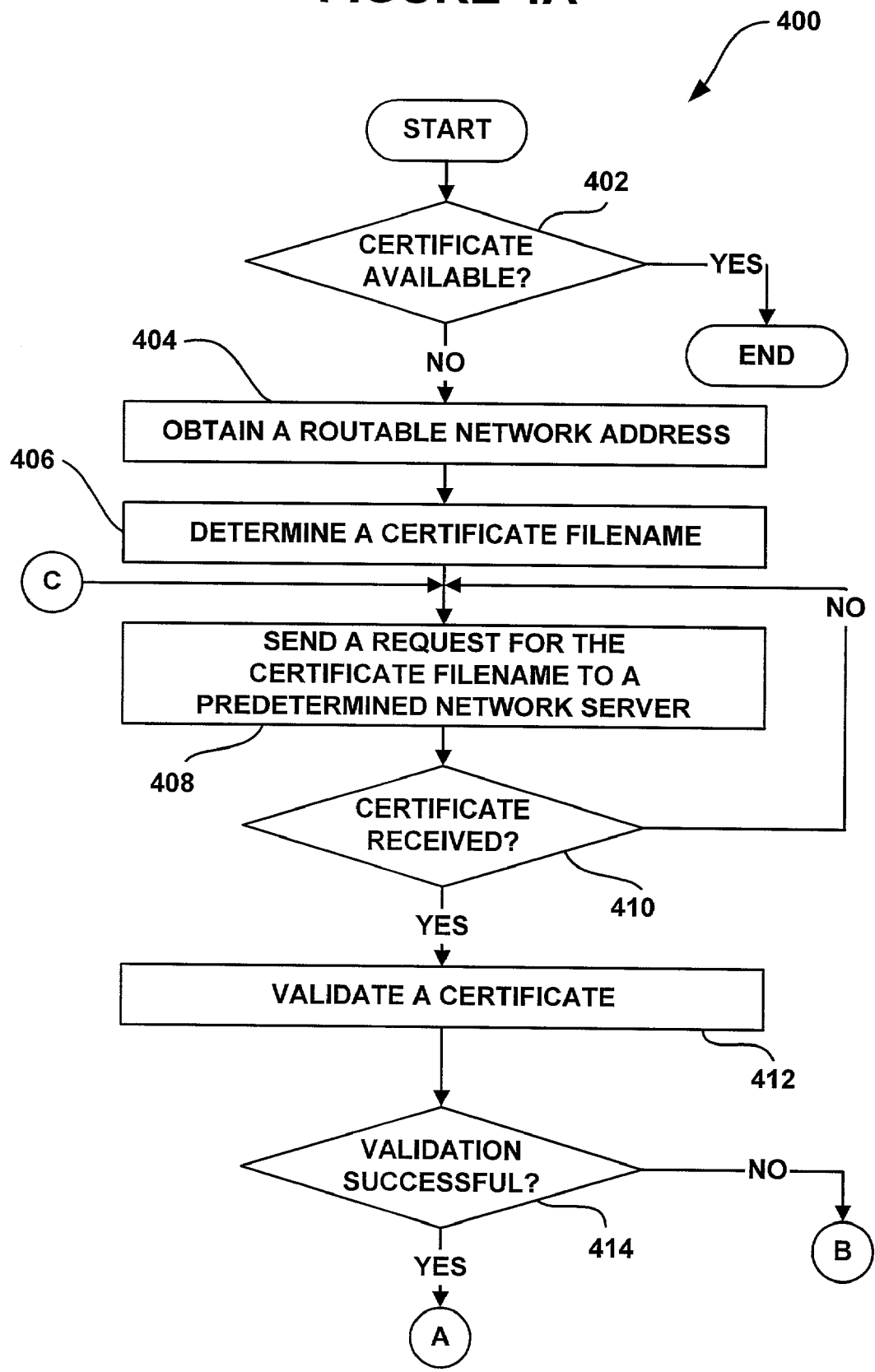

FIGS. 4A and 4B illustrate an exemplary method 400 for dynamic digital certificate installation on a network entity, such as a cable modem.

Referring to FIG. 4A, at step 402, a network entity determines whether a digital certificate is available on the network entity. Typically, digital certificates are stored in a flash memory unit or a Read Only Memory ("ROM") unit on network entities. Thus, the network entity may first search its memory units to determine whether the digital certificate is stored therein. If the network entity determines that it has a prestored digital certificate, the method 400 terminates. However, if the digital certificate is not available, at step 404, the network entity obtains a routable network address to communicate with a network server that is arranged to provide a digital certificate to the network entity. In an embodiment in which the network entity includes a cable modem, the cable modem may not be assigned a globally routable network address, such as a globally routable IP address, since, in some instances, the cable modem IP address contains an IP address from a private IP address space, thus, preventing the cable modem from accessing network entities on external networks. In such an embodiment, the network entity obtains a globally routable IP address by masquerading the identity of another network entity having a globally routable IP address, the methods of which will be described in reference to the subsequent figures. Alternatively, a cable modem may be assigned a globally routable IP address that may be used by a cable modem to access a network server configured to provide digital certificates to cable modems.

At step 406, the network entity determines a certificate filename. In one embodiment, a filename may be dynamically generated on the network entity, and a filename format may be based on a MAC address of the network entity, and a three-byte authentication code generated on the network entity. For example, the filename format may include the following format: "tt_xx_xx_xx_xx_xx_xx_yy_yy_yy.509," where the "tt" characters indicate the type of the network entity, the 'xx' characters define a MAC address of the network entity, and the 'yy' characters are authentication bytes that may be generated on the network entity by applying a predetermined hash function such as, for example, SHA-1, MD5, to a combination of input values being unique to the network entity such as, for example, a MAC address, a serial number, or other unique identification available on the network entity.

In one embodiment, the first 'tt' characters are used to communicate the type of the network entity. For example, if the network entity is a DOCSIS CM, the 'tt' characters may include "CM," or, alternatively, if the network entity is a EuroDOCSIS CM, the 'tt' characters may include "EM." Further, the authentication bytes may be generated on the network entity by applying a hash function to a MAC address, a serial number, and a secret string of the network entity. In such an embodiment, the secret string may be concatenated with the serial number and the MAC address to form (SecretString|SerialNumber|MAC Address). The concatenated string may then be hashed using one of the existing or later developed hash functions, such as the existing MD2, MD4, MD5 algorithms or Secure Hash Algorithms ("SHA"), such as an SHA-1 algorithm. For example, if the network entity applies the SHA-1 algorithm to the concatenated string, the SHA-1 hashing algorithm may generate a 512-bit output message digest. In such an embodiment, the authentication bytes for the filename may be formed by extracting the leftmost X-bits, such as 12 or 24 bits, of the message digest, and the authentication bytes may be formed using the following formula: AuthBytes=truncate (SHA(SecretString|MACAddress), X). However, the exemplary embodiments are not limited to such an implementation, and different methods for determining a filename on a network entity requesting a digital certificate from a network server may also be used.

Table 1 illustrates an exemplary embodiment for generating a filename on a network entity including a cable modem having a MAC address of '00:10:4b:ab:cd:ef,' a serial number of 'J09H7CDEF,' and a secret string of 'This is a secret string number one.'

TABLE 1

| | |
|---|---|
| Secret String | This is a secret string number one |
| Ser. No. | J09H7CDEF |
| MAC Address | 00:10:4B:AB:CD:EF |
| Input to a Secure Hash Algorithm | This is a secret string number one J09H7CDEF00:10:4B:AB:CD:EF |
| Digest | 91 DF D4 91 B2 A6 74 CA 17 BA 40 15 1E 96 B1 AE 82 E4 6F 43 |
| Authentication Bytes | 91 DF D4 |
| Filename | CM_00_10_4b_ab_cd_ef_91_df_d4_509 |

According to an exemplary embodiment illustrated in Table 1, the filename determined on the network entity is 'CM_00_10_4b_ab_cd_ef_91_df_d4_509,' where the xx's and yy's are expressed in a lower case. However, it should be understood that the embodiment illustrated in Table 1 is only an exemplary one, and different methods for determining filenames of digital certificates could also be used.

At step 408, the network entity sends a digital certificate request to a network server arranged to provide digital certificates. In one embodiment, a network address of the network server is pre-stored on the network entity so that the network entity requests a digital certificate from a predetermined network server. A cable operator may alter the address of the network server configured on the network entity using, for example, one of the methods associated with the SNMP, such as a Management Information Base ("MIB") mechanism. Further, the digital certificate request includes the certificate filename determined at step 406.

Referring back to FIG. 4A, when the network entity requests the digital certificate from the network server, at step 410, the network entity determines whether a digital certificate has been received from the server. In one embodiment, based on a configuration of the network server, as will be described in greater detail below, the network server may be arranged to dynamically create digital certificates upon receiving certificate requests from network entities. In such an embodiment, the network server may reject providing a digital certificate to a network entity upon receiving a first digital certificate request from that entity and may, subsequently, initiate a digital certificate creation process. Further, in such an embodiment, the network entity may be configured to periodically re-request the same filename from the network server. Thus, referring back to step 410, when the network entity does not receive the digital certificate upon sending the first request, the method 400 continues at step 408.

When the network entity receives a digital certificate file including at least one digital certificate, at step 412, the network entity validates a digital certificate in the file prior to installing the certificate in its memory unit. In one embodiment, the digital certificate file may include a device certificate and a device manufacturer certificate, and both certificates may be signed using digital signatures. If the digital certificate file includes a device manufacturer certificate, the network entity may validate a name of the entity that has issued the digital certificate. Further, the network entity may validate the digital signature on the manufacturer certificate using a public key, such as a DOCSIS public key available on the network entity.

To validate the device certificate, the network entity may verify whether a MAC address specified in the device certificate matches its own MAC address, and whether a name of the certificate issuer matches a subject name in the device manufacturer certificate. In addition to the device certificate and the device manufacturer certificate, the digital certificate file may also include an encrypted private key encoded, for example, in a type-length-value ("TLV") format. In such an embodiment, the network entity may decrypt the private key and verify that the private key is a match for the public key in the certificate. In order to do that, the network entity may compare a public modulus and a public exponent in the device certificate and in the private key. If the downloaded file does not contain a private key, the network entity may verify whether the public key in the device certificate matches the public key installed on the network entity and, further, whether it is a correct key for the private key already installed on the network entity.

If the digital certificate file fails one or more validation steps applied on the network entity, at step 422 in FIG. 4B, the network entity generates and sends an error message to the network server that has provided the digital certificate file. In the embodiment, where the network server includes a TFTP server, the network entity may generate and send a TFTP read request message to the TFTP server, with a filename having, for example, the following format: 'ERRnn_xx_xx_xx_xx_xx_xx.ERR,' where the 'nn' is a two digit error number, and the 'xx_ . . . _xx' is the MAC address of the network entity. Table 2 illustrates an exemplary set of error conditions that may occur during the certificate download from the network server, such as a TFTP server. However, it should be understood that the error conditions are only exemplary, and more or equivalent error conditions could also be used.

TABLE 2

| Error Number | Indication | Description |
|---|---|---|
| 01 | TFTP Timed Out | Aborted TFTP because of timeout waiting for server response. |
| 02 | MAC Address Mismatch | MAC Address in certificate is not for this CM |
| 03 | Public Key Mismatch | Public key in certificate does not match CM's stored key. |
| 04 | Public Key/Private Key Mismatch | Public key in certificate and downloaded private key are not a pair |
| 05 | Certificate CRC incorrect | CRC on the Certificate TLV is wrong |
| 06 | Private Key Outer CRC incorrect | Outer CRC on the Private Key TLV is wrong |
| 07 | File does not contain Certificate | Downloaded file does not contain a Type 0x0002 object. |
| 08 | Unknown TLV Type | Downloaded file contains unknown Type(s) |
| 09 | Certificate Signature Incorrect | Signature on certificate can not be validated against manufacturer public key. |
| 10 | Issuer Name Error | Certificate Issuer name is not identical to device manufacturer certificate subject name |
| 11 | Error Writing to FLASH memory | Unable to store item into FLASH. |
| 12 | Private Key Inner CRC incorrect | Inner CRC on the Private Key TLV is wrong |
| 13 | Manufacturer Certificate Subject Name Error | Manufacturer Certificate subject name is not a predetermine manufacturer name |
| 14 | Manufacturer Certificate Subject Public Key Mismatch | The public key in the Manufacturer Certificate does not match the one stored in the CM |

Based on the error conditions specified in Table 2 and the network settings described in reference to Table 1, if, for example, the received digital certificate file does not include a digital certificate, the filename error message generated on the network entity may have the following format: 'ERR07_00_10_4b_ab_cd_ef.ERR', where the two digit error number has been replaced with the error number for the files containing no certificates, and the 'xx_ . . . _xx' bits have been replaced with the MAC address of the network entity. Upon sending the filename error message to the network server, at step 424, the network entity may resend the request for the certificate filename to the network server, and the method 400 continues at step 408. In one embodiment, the network entity may be arranged to wait a predetermined period of time prior to resending the certificate request to the network server. If the network server is unreachable, or the file is not available, the network entity may retry reaching the network server at the following intervals: 10 minutes, 20 minutes, and 40 minutes, or different intervals depending on a network entity's configuration. If these four attempts are not successful in downloading the certificate file, or the downloaded file is determined to be invalid, the network entity may wait a longer time interval, such as a few hours, prior to re-requesting the certificate file from the network server.

Referring back to step 414, upon a successful validation of the certificate file received from the network server, at step 416, the network entity installs the received certificates in a memory unit. In one embodiment, the network entity may install the digital certificates in a flash memory unit or any other type of non-volatile memory unit.

Upon the successfully installation of the certificate file on the network entity, at step 418, the network entity sends to the network server a confirmation message indicating a successful installation and validation of the certificate at the network entity. In the embodiment, where the network server includes a TFTP server, the network entity may send to the network server a TFTP Read Request message having, for example, the following format: 'OK_xx_xx_xx_xx_xx_xx_zz_zz_zz.OK,' where the 'xx_ . . . _xx' bytes correspond to the MAC address of the network entity, and the 'zz_ . . . _zz' bytes correspond to the authentication bytes computed on the network entity. The message may also include additional embedded spaces for future use.

In one embodiment, the network entity may create the authentication bytes for the TFTP Read Request OK filename message using a different string from the one that was used to create the authentication bytes for the certificate filename. Further, the secret string in the Read Request OK message may be different than the secret string used on the network entity for creating the private key encryption key ("PKEK"). Subsequently, the secret string selected on the network entity may be concatenated with the MAC address of the network entity and the authentication bytes from the filename request to form (SecretString|MACAddress|AuthBytes). The format of the MAC address may be in an uppercase hexadecimal byte format separated by colons, such as the MAC address described in reference to Table 1, '00:10:4B:AB:CD:EF,' and the format of the authentication bytes may be in an uppercase hexadecimal, with no colons, such as the authentication bytes described in reference to Table 1, 91DFD4. The concatenated string may then be hashed using, for example, the SHA-1 algorithm, to generate a 512-bit output message digest. The authentication bytes may then be formed by truncating the leftmost X bits of the message digest using, for example, the following formula: AuthBytes=truncate(SHA(SecretString|MACAddress), X).

The authentication bytes may then be concatenated with the MAC address to form the OK filename message.

Table 3 illustrates an exemplary embodiment for generating an OK filename message on the network entity, using a MAC address of 00:10:4B:AB:CD:EF, a secret string of 'This is a secret string number two,' and the authentication bytes of 91 DFD4, as illustrated in reference to Table 1.

TABLE 3

| | |
|---|---|
| Secret String | This is a secret string number two |
| MAC Address | 00:10:4B:AB:CD:EF |
| Authentication Bytes | 91DFD4 |
| Input to a Secure Hash Algorithm | This is a secret string number two.00:10:4B:AB:CD:EF91DFD4 |
| Message Digest | 57 9F 26 26 CA F4 C3 D7 7E 34 D3 AC 59 73 3B 15 15 0C AB 05 |
| Authentication Bytes | 57 9F 26 |
| OK Filename message | OK_00_10_4b_ab_cd_ef_57_9f_26.OK |

At step 420, the network entity determines whether a confirmation response message has been received from the network server. In one embodiment, the network-entity may resend the OK filename message until it receives a response from the network server. In one embodiment, the OK filename message may be sent four times, with timeouts of 10, 20 and 40 seconds between the transmissions. Once the confirmation message is received from the network server, the method 400 terminates.

In the embodiment illustrated in FIG. 3, the network entity is the CM 304, and the network server is the server 302. However, it should be understood that the method 400 could be implemented using more, fewer, or equivalent network entities, and should not be limited to these network entities.

FIG. 5 is a flow chart illustrating an exemplary method for providing digital certificates by a network server according to one embodiment of the present invention.

At step 502, a network server, such as a TFTP server, receives from a network entity a request including a filename of a digital certificate. In one embodiment, a format of the filename may be 'tt_xx_xx_xx_xx_xx_xx_yy_yy_yy.509,' where the 'tt' characters are used to indicate the type of the network entity, the 'xx_ . . . _xx' characters include a MAC address of the network entity, and the 'yy_ . . . _yy' characters include authentication bytes. The method of generating the filename on the network entity has been described in reference to the method 400 illustrated in FIGS. 4A and 4B.

Upon the receipt of the request for the digital certificate from the network entity, at step 504, the network server authenticates the request. In one embodiment, the network server may authenticate the request using the authentication bytes in the filename. To do that, the network server may derive authentication bytes using a MAC address specified in the filename and a secret string. For example, the server may employ a single shared secret across all network entities requesting digital certificates. Further, the network server may be arranged to employ a shared secret based on a unique class of a network entity, i.e., a manufacturer or a model number, or it may employ different shared secrets for different network entities. The network server may use the same authentication byte generation method as was earlier described in reference to FIGS. 4A and 4B.

Upon generating the authentication bytes, at step 506, the network server determines whether the authentication was successful. To do that, the network server may compare the authentication bytes in the received filename request with the authentication bytes generated on the network server. If the two authentication byte sets do not match, at step 508, the network server rejects providing the certificate to the network entity by sending a rejection message to the network entity. For example, if the network server includes a TFTP server, the rejection request message may include a read request message with an embedded error code. However, different or equivalent message types indicating request-rejection errors could also be used instead. When the network server sends the rejection request message, the method 500 terminates.

However, if the network server determines that the authentication process was successful, the network server may initiate a certificate installation process. According to one embodiment, the network server may be preloaded with digital certificates for network entities that may request digital certificates using the exemplary methods. However, such an implementation may be not the most optimal one since typically a fee is associated with the creation of a certificate, and it would not be the most economical solution to create certificates ahead of time. Instead, the network server may create digital certificate dynamically upon receiving digital certificate requests from network entities.

At step 510, the network server determines whether the digital certificate is available. If the digital certificate is not available, at step 514, the network server sends a request rejection message including a 'File_Name_Not_Found' error message.

Upon sending the request rejection message to the network entity, at step 516, the network server creates a certificate file including at least one digital certificate for the network entity. In one embodiment, the at least one digital certificate for the network entity includes a device certificate. However, in addition to the device certificate, the network server may create a device manufacturer certificate and a private key for the network entity. To create the device certificate, the network server may communicate with a predetermined manufacturer server to retrieve manufacturer database information to be used during the certificate creation process. In one embodiment, the manufacturer information may include a device public key. Alternatively, the network server may store the manufacturer information in its internal or external database. In one embodiment, the network server may be arranged to employ a unique algorithm depending on a manufacturer of a network entity requesting a digital certificate; however, different embodiments are possible as well.

Once the network server obtains the manufacturer's information for the network entity, the network server creates a digital certificate. Alternatively, the network server may communicate with another server, such as a Certificate Authority server that may be arranged to generate a digital certificate upon receiving a digital certificate request from the network server and then provide the certificate to the network server. Once the digital certificate is created, the network server stores the certificate under the filename specified in the request. In one embodiment, the file including the digital certificate may be stored in an internal database on the network server. Alternatively, the network server may store the file with the certificates in an external database arranged to store digital certificates and, further, having a communication link with the network server.

In an embodiment, where the network server dynamically creates certificates, the network entity may be arranged to periodically re-request the certificate using the same filename. For example, the network entity may be arranged to resend the certificate request on a daily basis, or at the predetermined time intervals, such as 2 hours, 4 hours, 6 hours, or some other specified time period.

Referring back to step 510, if the network server determines that the digital certificate is available, at step 512, the network server provides the digital certificate to the network entity, and the method 500 terminates.

According to the embodiment illustrated in FIG. 3, the network server of the method 500 may include the server 302, and the network entity may include the CM 304. However, it should be understood that the method 500 could be implemented using more, fewer, different or equivalent network entities.

Once a digital certificate is downloaded on the CM 304, the CM 304 may stay registered and operational, while not re-initializing the MAC. Alternatively, the CM 304 may be arranged to re-initialize the MAC interface. In an embodiment where the CM 304 does not re-initialize the MAC, the CM 304 may be restarted to enter the BPI+ mode by some external means, such as, for example, a power cycle, an SNMP command, or a CMTS restart.

Referring back to the method 400 illustrated in FIGS. 4A and 4B, when the method is applied on the CM 304, the CM 304 may be assigned a private IP address. In such an embodiment, if the CM 304 needs a globally routable IP address to communicate with network server 302, CM 304 borrows the identity associated with one of the CPEs being served by CM 304. At step 404, the CM 304 obtains a routable network address by masquerading as one of its CPE devices such as the CPE 18. In order for the CM 304 to masquerade the CPE 18, the CM 304 obtains configuration information parameters of the CPE 18 so that frames created on the CM 304 appear to the cable network 14 as frames from the CPE 18. The configuration information parameters of the CPE 18 may include a CPE MAC address, a CPE IP address, and a default gateway MAC address used by the CPE 18. Using these parameters, the CM 304 may construct frames masquerading the identity of the CPE 18 and, further, to transmit the frames to the default gateway used on the CPE 18. According to exemplary embodiments, the CM 304 may obtain a globally routable IP address of the CPE 18 using two methods that will be described in reference to subsequent figures. However, it should be understood that different or equivalent methods could also be used.

FIG. 6 is a flow chart illustrating a method 600 for obtaining a globally routable IP address on a network device.

At step 602, a network device creates a customer entity table including network address pairs associated with customer entities receiving network services from the network device. For example, a network address pair may include a MAC address and an IP address of a customer entity. The network device may obtain address pairs of customer entities by monitoring data being transmitted from the customer entities through the network device and retrieving the address pairs from upstream frames sent from the customer entities.

However, to masquerade the identity of a customer entity, the network device has to determine a MAC address of a default gateway used by the customer entity. To do that, at step 604, the network device sends a control message to at least one customer entity specified in the customer entity table. In one embodiment, the control message may include an Internet Control Message Protocol ("ICMP") ECHO request message. More information on the ICMP may be found in the RFC-792, incorporated herein by reference. The ICMP ECHO request message sent from the network device includes a source IP address that matches an IP address of a network device known to be on some other subnet. For example, the source IP address specified in the ICMP ECHO request message may include an IP address of a network server that the network device wishes to communicate with. Further, a source MAC address in the ICMP ECHO request message may include a MAC address of the network device, a destination IP address may include an IP address of the customer entity, and a MAC destination address may include a MAC address of the customer entity.

Upon sending the control message to the customer entity, at step 606, the network device intercepts an ICMP echo response message having a destination IP address matching the IP address of the network server specified in the ICMP ECHO request message. At step 608, the network device extracts a destination network address such as a MAC address from the received frame. This MAC address corresponds to a MAC address of a default gateway associated with the customer entity. At step 610, the network device updates the customer entity table with the MAC address of the default gateway associated with the customer entity.

According to the embodiment illustrated in FIG. 3, the network device of the method 600 may include the CM 304, the customer entity may include the CPE 18, and the network server may include the network server 302. However, it should be understood that the exemplary method 600 is not limited to the entities illustrated in FIG. 3, and it could be applied using more, different, or equivalent network entities.

As is known in the art, a CPE typically keeps track of its own DHCP leases. Thus, the CM 304 may be arranged to determine whether the IP lease on the CPE 18 has not expired prior to using the IP address of the CPE 18 to access the network server 302. To do that, the CM 304 may send an ICMP ECHO message to the CPE 304. Alternatively, the CM 304 may send an ICMP ECHO request message to a default gateway or a DHCP server associated with the CPE 18. However, different methods could also be used. For example, the CM 304 may be arranged to operate as a DHCP proxy and renew DHCP leases for the attached CPEs, as described in the co-pending U.S. patent application Ser. No. 09/772,095, entitled "A system and Method for a Specialized Dynamic Host Configuration Protocol Proxy in a Data-Over-Cable Network." Thus, instead of creating a customer entity table as described in reference to FIG. 6, the CM 304 may monitor DHCP traffic exchanges between CPEs located on its local subnet and DHCP servers. The DHCP traffic is identified as UDP packets using predetermined port numbers. For example, the frames from the CPEs to DHCP servers may include a destination port of bootps=67, and a source port of bootpc=68. Further, the frames from the DHCP server to the CPEs will have a destination port of bootpc=68, and a source port of bootps=67. Since the source port is typically included in a first byte of the UDP and TCP headers for these packets, and the BOOTP ports are reserved for both UDP and TCP traffic, the CM 504 may quickly eliminate most non-BOOTP traffic frames by first checking the value of the source port in UDP/TCP headers and then checking for the correct value in IP header fields, e.g., Protocol=UDP, etc.).

FIG. 7 is an exemplary block diagram illustrating a message flow 700 where the CM 304 monitors DHCP traffic between the CPE 18 and a DHCP server 712 during a DHCP CPE address acquisition. When the CPE 18 initiates a DHCP process, the CPE 18 generates a DHCP DISCOVER message 702 to discover a network host interface and obtain a globally routable IP address. Next, the CPE 18 may broadcast the DHCP DISCOVER message 702 on its local network. Upon a receipt of the DHCP DISCOVER message 702 on the CM 304, the CM 304 forwards the message 702 to the CMTS 12 that, subsequently, forwards it to one or more DHCP servers.

When one or more DHCP servers receive the DHCP DISCOVER message 702, at least one DHCP server 712 responds with one or more DHCP OFFER messages 704. The DHCP OFFER messages 704 include, among other parameters, an available routable IP address and a lease time interval associated with the IP address. The DHCP OFFER messages 704 are transmitted from the DHCP servers 712 via the CMTS 12 and the CM 304 to the CPE 18. When the CPE 18 receives more than one DHCP OFFER messages 704, the CPE 18 selects one of the received offers based on, for example, the length of the lease time intervals specified in the offers. For example, the CPE 18 may select a DHCP OFFER including the longest lease time interval associated with a globally routable IP address specified in the selected DHCP OFFER.

Upon selecting one of the DHCP OFFER messages, the CPE 18 generates a DHCP REQUEST message 706 to request configuration parameters, e.g. a globally routable IP address, from a DHCP server that has issued the DHCP OFFER message selected by the CPE 18. The DHCP REQUEST message 706 is sent to the DHCP server 712 via the CM 304 and the CMTS 12. When the selected DHCP server 712 receives the DHCP REQUEST message 706, the DHCP server 712 responds with a DHCP ACKNOWLEDGE ("DHCP ACK") message 708 that is transmitted to the CPE 18 via the CMTS 12 and the CM 304. The DHCP ACK message 708 confirms the receipt of the DHCP REQUEST message 706 and allocation of the configuration parameters specified in the DHCP OFFER message 704 issued for the CPE 18 by the DHCP server.

During the DHCP process, the CM 304 creates a customer-entity-mapping table including a CPE IP address, a CPE MAC address, a lease time interval for the CPE IP address, and a gateway IP address. For example, the CM 304 may retrieve the CPE MAC address from the DHCP DISCOVER message 702, and further, the CPE IP address, the lease time interval and the gateway IP address from the DHCP ACK message 708. The exemplary embodiment illustrated in FIG. 7 as well as subsequent embodiments illustrate only one CPE 18. However, it should be understood that the customer entity-mapping table may include records for all CPEs associated with the CM 304.

Further, once the CM 304 determines the gateway IP address, the CM 304 may generate an Address Resolution Protocol ("ARP") request message to determine a MAC address of the gateway. The ARP request message includes a source IP address field including an IP address of the CM 304, a source MAC field including a MAC address of the CM 304, a destination IP address field including the IP address of the gateway and a blank destination MAC address field. Subsequently, the CM 304 may broadcast the ARP request message on its local network. Once the gateway receives the ARP request message, the gateway responds to the ARP request message by generating an ARP response message including the MAC address of the gateway, and sends it to the CM 304. When the CM 304 receives the ARP response message, the CM 304 updates the customer-entity-mapping table with the MAC address of the gateway associated with the CPE 18.

FIG. 8 is a block diagram illustrating an exemplary message flow 800 where the CM 304 monitors DHCP traffic during a DHCP address renewal process.

Prior to the end of the IP address lease, the CPE 18 generates a DHCP REQUEST message 802 to renew the lease of the IP address and sends it to the DHCP server 712 that has issued the IP address for the CPE 18. The DHCP REQUEST message 802 is sent to the DHCP server 712 via the CM 304 and the CMTS 12.

When the DHCP server 712 receives the DHCP REQUEST message 802, the DHCP server 712 may verify whether the IP address specified in the message 802 is available. If the IP address is available, the DHCP server 912 may assign the same IP address to the CPE 18 with a new lease time interval. However, if the requested IP address is no longer available, the DHCP server 712 may provide a new IP address to the CPE 18. Subsequently, the DHCP server 712 may generate a DHCP ACK message 804 and may then send it to the CPE 18 via the CMTS 12 and the CM 304. The DHCP ACK message 804 includes an IP address, a least time interval and IP gateway address.

Once the CM 304 receives the DHCP ACK message 804, the CM 304 updates the CPE record in the customer-entity-mapping table with the IP address, the lease time, and the gateway address specified in the DHCP ACK message 804. Then, the CM 304 forwards the DHCP ACK message 804 to the CPE 18.

FIG. 9 is a block diagram illustrating an exemplary message flow 900, where the CM 304 monitors DHCP traffic during a DHCP address rejection process.

Similarly to the DHCP address renewal process described in reference to FIG. 8, prior to the end of the lease time interval, the CPE 18 generates a DHCP REQUEST message 902 including a lease renewal request for the IP address assigned to the CPE 18. Next, the CPE 18 sends the DHCP REQUEST message 902 to the DHCP server 712 via the CM 304 and the CMTS 12.

When the DHCP server 712 receives the DHCP REQUEST message 902, the DHCP server 712 may reject renewal of the IP address specified in the message 902 and, further, may reject assigning a new IP address to the CPE 18. In such an embodiment, the DHCP server 712 sends a DHCP Negative Acknowledgement ("NAK") message 904 indicating an IP lease renewal rejection. The DHCP NAK message 904 is sent to the CPE 18 via the CMTS 12 and the CM 304. When the CM 504 detects the DHCP NAK message 904, the CM 304 updates the customer-mapping table, as illustrated at 906, by marking the IP address of the CPE 18 as an expired lease address record.

FIG. 10 is a block diagram illustrating an exemplary message flow 1000, where the CM 304 monitors DHCP traffic during a CPE address release process. When the CPE 18 initiates an address release process, the CPE 18 generates a DHCP RELEASE message 1002 including the IP address to be released. Next, the CPE 18 sends it to the DHCP server 712 via the CM 304 and the CMTS 12. When the CM 304 detects the DHCP RELEASE message 1002, the CM 304 updates the customer-entity-mapping table by marking the CPE IP address in the table as a released IP address. Subsequently, the CM 504 forwards the DHCP RELEASE message 1002 to the DHCP server 712 via the CMTS 12.

Thus, when the CM 304 attempts to request a certificate from the server 302, the CM 304 masquerades the identity of a CPE by selecting an IP address with a valid lease and uses it as its own IP address. The CM 304 may select an IP address from the customer entity mapping table described in reference to FIGS. 7–10, or the customer entity table described in reference to FIGS. 6A and 6B. However, it should be understood that different methods could also used for obtaining a globally routable IP address on the CM.

Further, it should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for automatic installation of digital certificates on a network entity such as a cable modem may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for automatic installation of a digital certificate on a cable modem in a data-over-cable system, the method comprising:
   performing a digital certificate installation process on the cable modem during initialization to determine whether a digital certificate is installed on the cable modem, the determination being made by the cable modem; if not,
   generating a digital certificate filename on the cable modem;
   generating a digital certificate request including the digital certificate filename on the cable modem, the digital certificate request being initiated by the cable modem;
   sending the digital certificate request including the digital certificate filename from the cable modem to a predetermined network server;
   receiving a digital certificate file on the cable modem including at least one digital certificate, the digital certificate file having been sent from the network server; and
   storing the at least one digital certificate received from the network server on the cable modem;
   wherein the digital certificate is required to authenticate the cable modem on a Cable Modem Termination System (CMTS) to prevent unauthorized cable modems from accessing services of the CMTS.

2. A computer readable medium having stored therein instructions for causing a processor to execute the method of claim 1.

3. The method of claim 1, wherein the network server comprises a Trivial File Transfer Protocol server.

4. The method of claim 1, wherein the digital certificate comprises an X.509 security digital certificate.

5. The method of claim 1, wherein the step of generating a digital certificate filename comprises using a type of the cable modem, a physical address of the cable modem and an authentication data string.

6. The method of claim 5, wherein the authentication data string is generated on the cable modem by applying a hash function to at least one configuration setting associated with the cable modem.

7. The method of claim 6, wherein the at least one configuration setting comprises a MAC address, a serial number or a secret string.

8. The method of claim 1, further comprising:
   obtaining a globally routable network address on the cable modem prior to sending the digital certificate request to the network server; and
   employing the globally routable network address for sending the digital certificate request to the network server.

9. The method of claim 8, wherein the step of obtaining the globally routable network address on the cable modem comprises:
   retrieving network address information from at least one data packet sent from at least one customer entity; and
   obtaining a physical address of a network gateway associated with the at least one customer entity.

10. The method of claim 9, wherein the network address information comprises on Internet Protocol address and a Medium Access Control address associated with the customer entity.

11. The method of claim 1, further comprising:
    validating the at least one digital certificate received from the network server prior to storing the at least one digital certificate on the cable modem.

12. The method of claim 1, wherein the at least one digital certificate comprises a device digital certificate.

13. The method of claim 12, wherein the at least one digital certificate further comprises a cable modem manufacturer digital certificate.

14. A method for providing digital certificates to at least one cable modem in a data-over-cable system, the method comprising:
    performing a digital certificate installation process on the cable modem during initialization to determine whether a digital certificate is installed on the cable modem, the determination being made by the cable modem; if not,
    generating a digital certificate request on the cable modem, the digital certificate request being initiated by the cable modem;
    receiving the digital certificate request including a digital certificate filename on a network server from the cable modem;
    authenticating the request on the network server using at least one parameter specified in the digital certificate filename;
    generating at least one digital certificate for the cable modem; and
    providing the at least one digital certificate from the network server to the cable modem;
    wherein the digital certificate is required to authenticate the cable modem on a Cable Modem Termination System (CMTS) to prevent unauthorized cable modems from accessing services of the CMTS.

15. A computer readable medium having stored therein instructions causing a processor to execute the method of claim 14.

16. The method of claim 14, wherein the filename comprises a type of the cable modem, a physical address of the cable modem, and authentication data string generated on the cable modem.

17. The method of claim 16, wherein the step of authenticating the request using the at least one parameter specified in the digital certificate filename comprises:
generating an authentication data string on the network server; and
comparing the authentication string generated on the network server with the authentication data string specified in the received digital certificate filename.

18. The method of claim 14, wherein the network server comprises a Trivial File Transfer Protocol server.

19. The method of claim 14, wherein the at least one digital certificate for the cable modem is generated on the network server.

20. The method of claim 14, further comprising:
requesting a digital certificate from a second network server upon receiving the digital certificate request from the cable modem; and
receiving the digital certificate on the network server from the second network server, wherein the second network server comprises a certificate authority server.

21. A system for dynamic digital certificate installation in a data-over-cable network, the system comprises, in combination:
a cable modem configured to determine whether a digital certificate is installed on the cable modem during initialization, and if not, request a digital certificate from a predetermined network server; and
the network server configured to dynamically generate a digital certificate upon receiving a digital certificate request including a digital certificate filename from the cable modem, the digital certificate request including the digital certificate filename having been initiated by the cable modem, and further configured to provide the digital certificate to the cable modem;
wherein the digital certificate is required to authenticate the cable modem on a Cable Modem Termination (CMTS) to prevent unauthorized cable modems for accessing services of the CMTS.

22. The system of claim 21, wherein the network server comprises a Trivial File Transfer Protocol ("TFTP") server.

23. The system of claim 21, wherein the network server's address is installed on the cable modem prior to requesting the digital certificate from the predetermined network server.

24. The system of claim 21, wherein the cable modem is further arranged to install the digital certificate in a memory unit upon receiving the digital certificate from the network server.

25. The system of claim 21, wherein the digital certificate comprises an X.509 certificate.

* * * * *